United States Patent [19]

Hamatani

[11] Patent Number: 4,720,065
[45] Date of Patent: Jan. 19, 1988

[54] TRANSLATABLE OUTWARD OPENING PLUG-TYPE AIRCRAFT DOOR AND ACTUATING MECHANISMS THEREFOR

[75] Inventor: Tomio Hamatani, King County, Wash.

[73] Assignee: The Boeing Company, Seattle, Wash.

[21] Appl. No.: 694,426

[22] Filed: Jan. 24, 1985

[51] Int. Cl.$^4$ .............................................. B64C 1/14
[52] U.S. Cl. ................................... 244/129.5; 244/905
[58] Field of Search .......... 244/129.5, 137 P, DIG. 2, 244/118.5; 49/248, 249; 16/370, 56, 58

[56] References Cited

U.S. PATENT DOCUMENTS

| | | | |
|---|---|---|---|
| 3,004,303 | 10/1961 | Wilmer | 244/129.5 |
| 3,051,280 | 8/1962 | Bergman et al. | 244/129.5 |
| 3,255,482 | 6/1966 | Flint | 16/56 |
| 3,574,886 | 4/1971 | Solovieff | 16/58 |
| 3,791,073 | 2/1974 | Baker | 244/129.5 |
| 4,080,687 | 3/1978 | Jentsch | 16/56 |
| 4,125,235 | 11/1978 | Fitzgerald et al. | 244/137 P |
| 4,414,703 | 11/1983 | Schnarr et al. | 16/56 |
| 4,483,043 | 11/1984 | Tillman | 16/56 |
| 4,497,462 | 2/1985 | Hamatani | 244/129.5 |

FOREIGN PATENT DOCUMENTS 1244016 7/1967 Fed. Rep. of Germany ........ 49/350

Primary Examiner—Joseph F. Peters, Jr.
Assistant Examiner—Lynn M. Fiorito
Attorney, Agent, or Firm—Hughes & Cassidy

[57] ABSTRACT

An inward/outward movable plug-type aircraft passenger door (50) including: (i) a hinge assembly (56) and programming control mechanism (100, 114, 116 and 105, 114, 119) therefor; (ii) a latch/unlatch mechanism (58, 70, 82, 88, 89, 90, 91, 92, 94 and 95) therefor; (iii) a pressure lock gate (69) and actuating mechanism (58, 75, 76, 78, 79, 80, 81, 82 and 84) therefor; and (iv), a deployable emergency evacuation system (59) and actuating linkage (60, 132, 134, 135, 136, 138, 139, 140, 141, 142 and 144); wherein the aircraft door (50) is of the type adapted to be translated between a first fully closed and latched position and a second fully opened position while being maintained essentially parallel to the plane containing the ingress/egress cutout opening (51) in the fuselage (52) at all intermediate door positions—i.e., the aircraft door (51) is not pivoted or rotated about the hinge axis (104 and/or 109) to, in effect, turn the door (51) inside-out, but, rather, is moved with translatory motion outward of the ingress/egress cutout opening (51) in the fuselage (52) to a fully open position where the door's inner skin (66) is in facing relation to the fuselage (52) outer skin.

18 Claims, 25 Drawing Figures

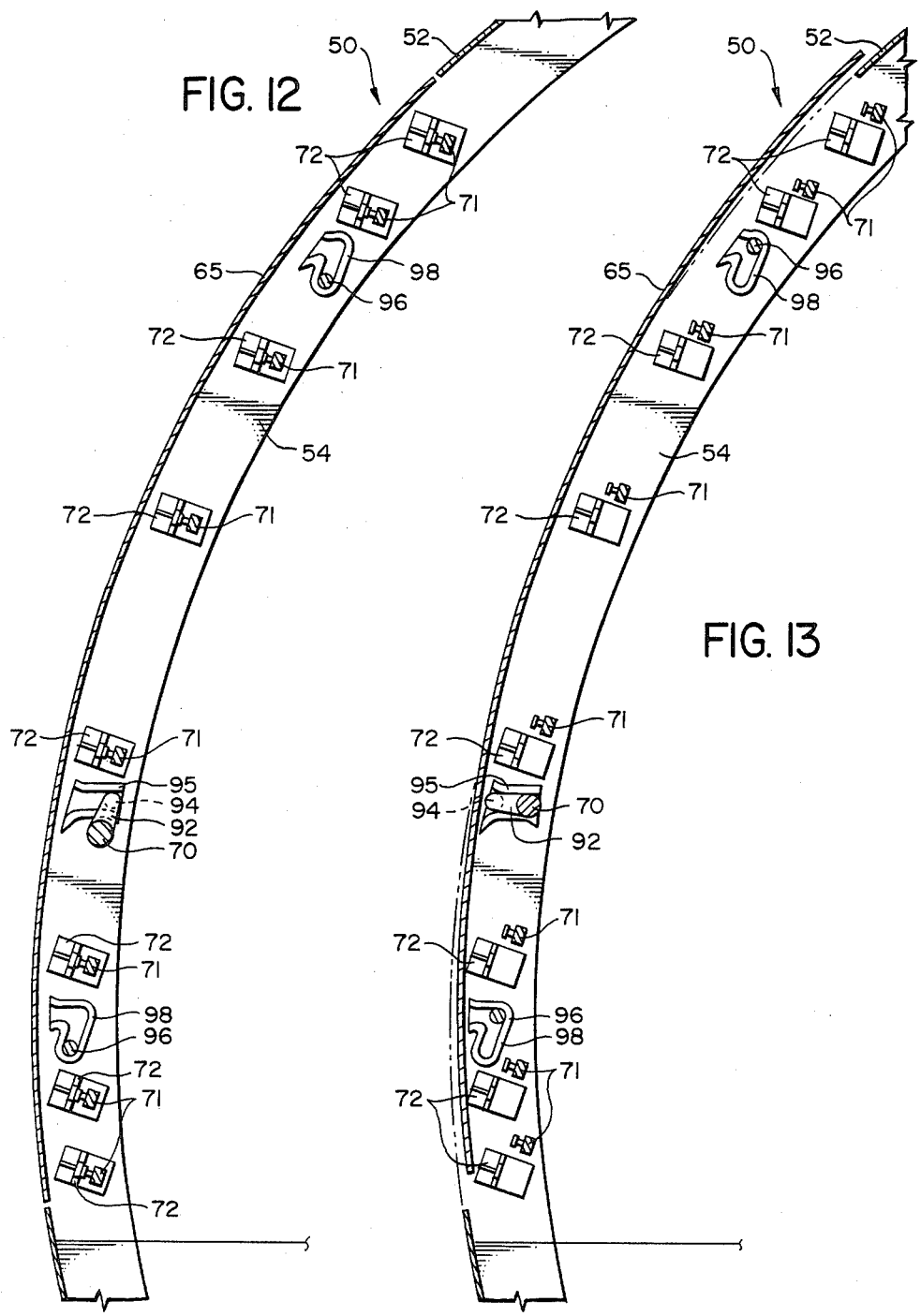

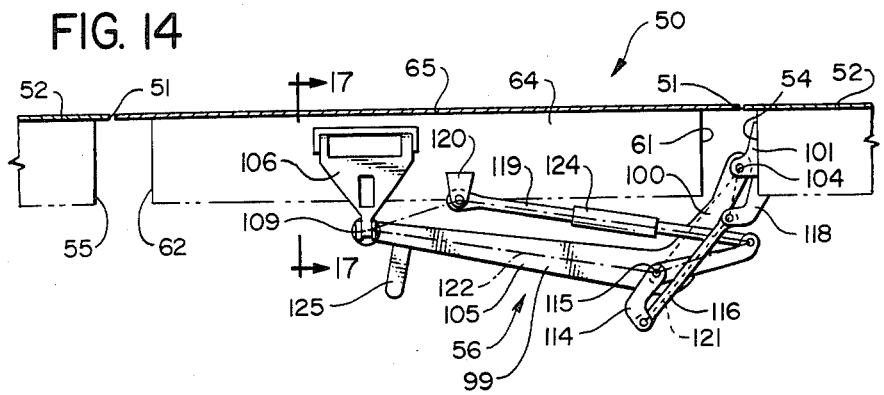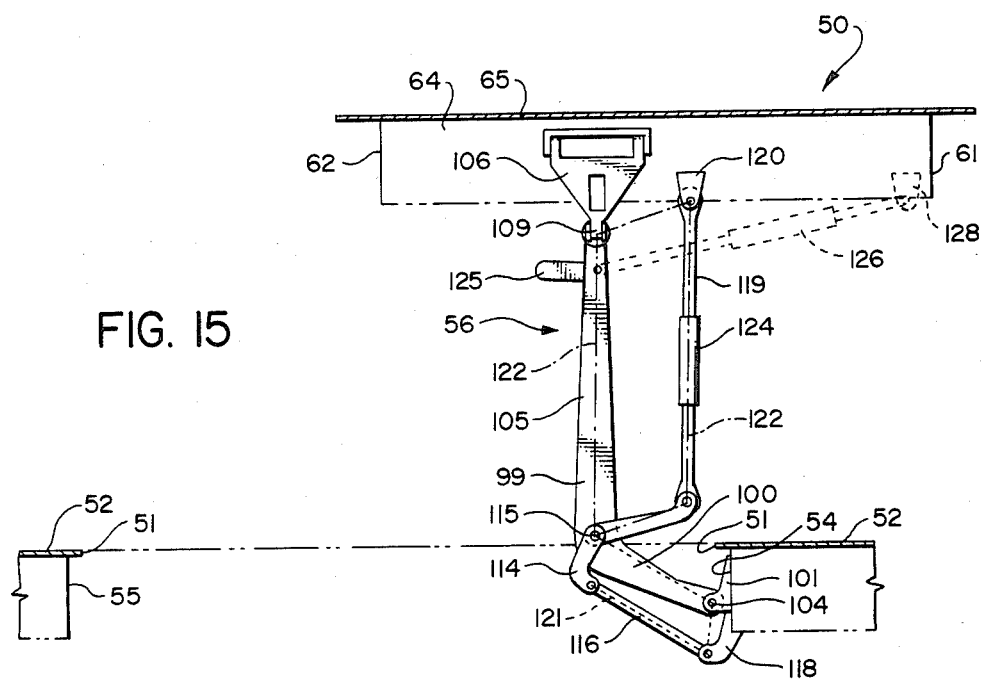

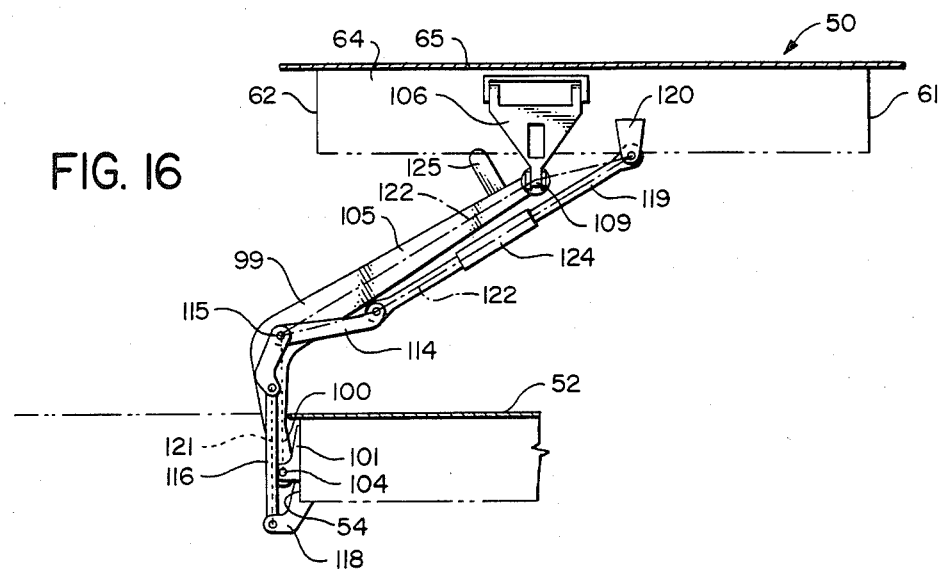
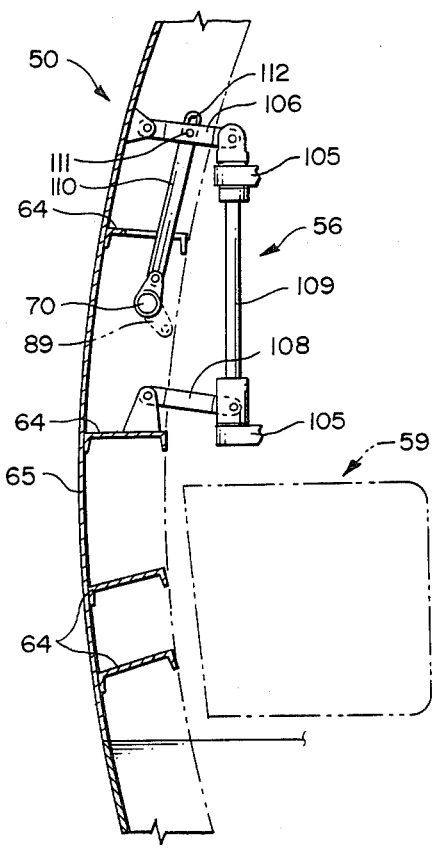
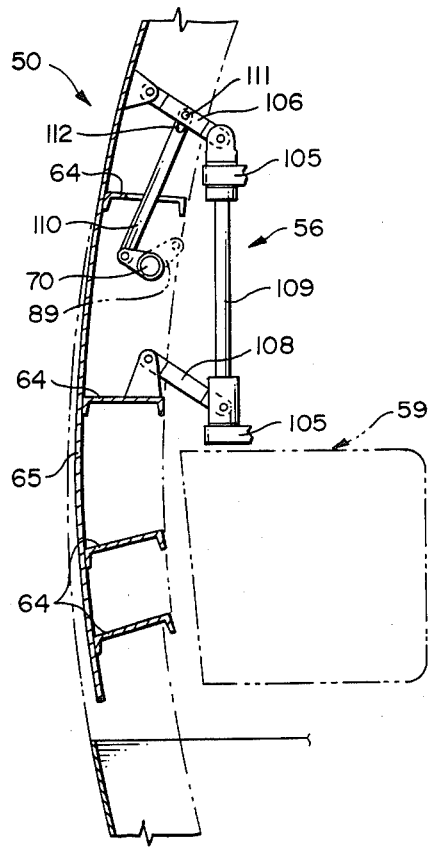

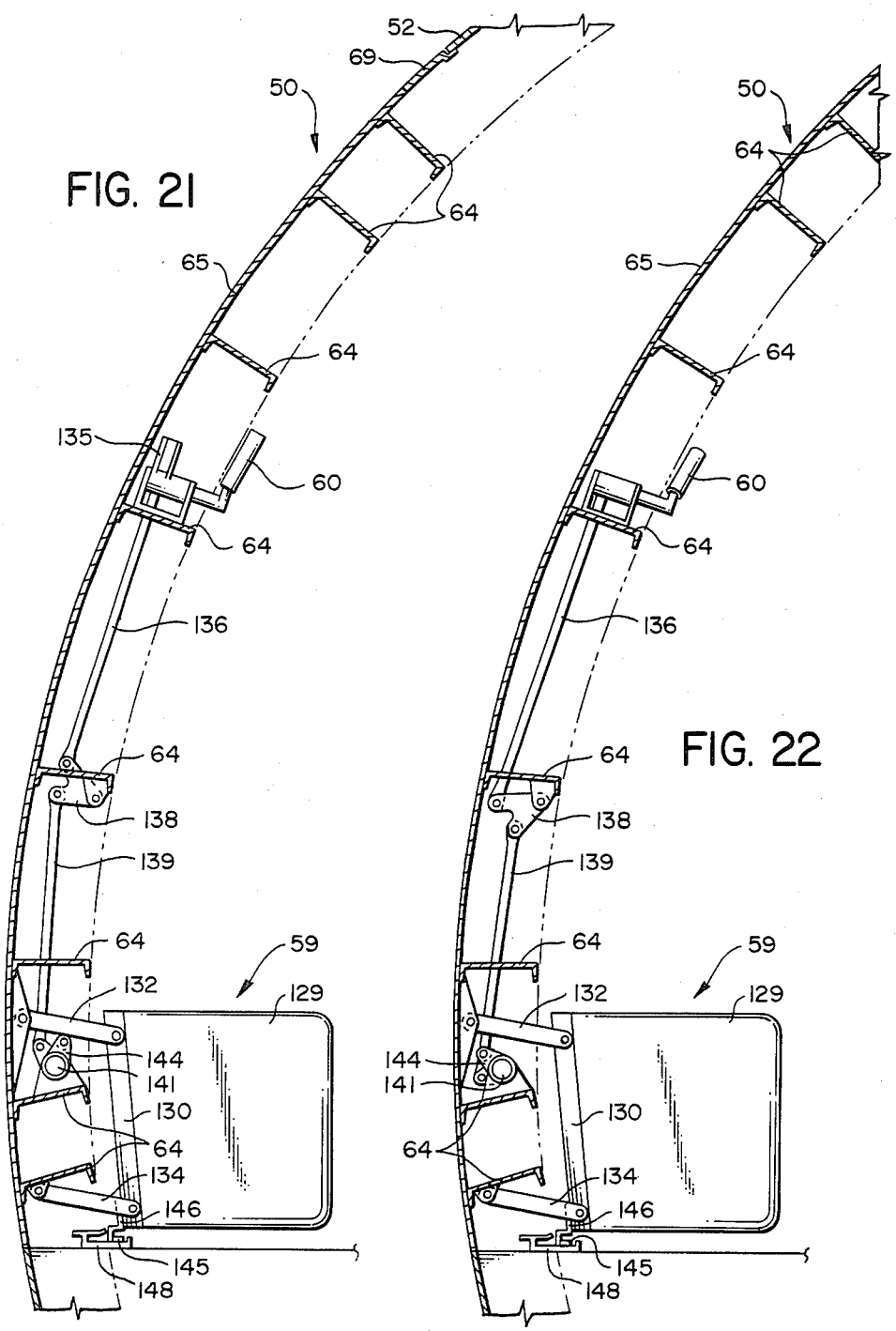

TRANSLATABLE OUTWARD OPENING PLUG-TYPE AIRCRAFT DOOR AND ACTUATING MECHANISMS THEREFOR

BACKGROUND OF THE INVENTION

1. Technical Field

The present invention relates generally to plug-type aircraft doors; and, more particularly, to inwardly/outwardly movable plug-type aircraft doors of the type which are adapted to be translated between a first fully closed and latched position and a second fully open position while being maintained at all times in a plane essentially parallel to the plane containing the ingress/egress cutout opening formed in the aircraft fuselage—i.e., the aircraft door is not appreciably moved into the aircraft interior during any portion of a door opening/closing operation; nor is it pivoted or rotated about the hinge axis to, in effect, turn the door inside-out when fully open. Rather, aircraft doors embodying the features of the present invention are moved with translatory motion about a vertical, or near vertical, hinge axis, thus effectively limiting the need for imposition of the significant manual forces heretofore required to move relatively heavy aircraft doors in an uphill direction during significant portions of a door opening and/or closing operation when the doors are pivotally or rotationally mounted for movement about an inclined hinge axis. Since aircraft doors constructed in accordance with the present invention are intended to be operated about a vertical, or near vertical, hinge axis, the invention finds particularly advantageous use in connection with narrow-bodied commercial passenger aircraft where relatively constant fuselage frame cross-sections are available permitting mounting of one or more aircraft doors at various fore and/or aft locations.

2. Background Art

Conventional commercial aircraft are commonly provided with a multiplicity of ingress/egress openings in the aircraft fuselage with suitable doors being provided for closure of such openings. The doors vary widely in terms of their construction and operation. Commonly, such doors are plug-type doors which are designed to fit into the ingress/egress openings when the doors are closed so as to form a substantially smooth, continuous, uninterrupted, exterior skin surface. When such doors are opened, they may be moved through any of several different paths, dependent upon the particular door design employed. For example, some plug-type aircraft doors are of the type which move inwardly into the aircraft and slide upwardly along tracks deployed on the interior of the fuselage with the door being received within a compartment immediately above the ceiling in the passenger cabin. In still other instances, the doors are pivoted about the axis of a first torque tube assembly mounted in the door and moved slightly inboard, at which point the doors are pivoted simultaneously about the axes of both the first door-mounted torque tube assembly and a second torque tube assembly mounted in the fuselage body structure and to which the door is hingedly connected, with the door moving outwardly through the ingress/egress opening, and swinging through an arc approximating 180° so that when fully open, the door is entirely disposed outside of the aircraft fuselage, lying in a plane generally parallel to the aircraft centerline and with the door's outer skin surface essentially in face-to-face contact with the outer skin surface of the fuselage—i.e., the door is, in effect, turned inside-out. In most instances today, doors of the foregoing character are manually operated by on-board flight attendants since most commercial aircraft carriers are reluctant to rely upon electrical actuating systems which are subject to electrical malfunction. As a consequence, and due to the rather significant weight of the doors and the limited strength of crew attendants, it has been necessary to provide rather sophisticated counterbalance systems so as to enable the on-board flight attendant to manipulate such doors, particularly when the doors are being moved along an uphill path—a necessity when the door's hinge axis is other than essentially vertical.

In recent years, some commercial aircraft have employed ingress/egress doors which are capable of translatory motion about a vertical, or near vertical, hinge axis, thus permitting the on-board flight attendant (or ground crew members located external to the aircraft) to open the door by translating the door outwardly with the door, when fully opened, occupying a position wherein the interior skin surface of the door is in facing relation to the exterior fuselage skin surface. Because the door is moved about a vertical, or near vertical, hinge axis, the door is in essentially a balance position during all portions of door opening and/or closing movement, thus effectively eliminating the need to move the door uphill and enabling even those on-board flight attendants having relatively low body weights and limited strength to manipulate doors weighing two, three or more times the body weight of the flight attendant with relative ease.

Nevertheless, outwardly opening translatory plug-type doors of conventional construction have continued to pose a number of significant problems for aircraft designers. One of the more significant of these problems is directly related to the requisite hinge mechanism and actuating linkages which are needed to interconnect the door to the aircraft fuselage frame structure. More specifically, with such constructions, the aircraft door is commonly supported in cantilever fashion from one end of a hinge assembly coupled to the fuselage frame; and, since the hinge elements and other associated operating linkages must, in effect, go around a corner as the door is moved towards a fully opened position, they have tended to be rather complex and, moreover, they tend to project into the ingress/egress cutout opening when the door is fully open, thus effectively reducing the size of an unobstructed door opening. Moreover, in some instances, the hinge assembly and/or associated actuating linkages limit the degree of permissable door opening movement. As a consequence of the foregoing problems, and in order to meet the specifications of commercial aircraft carriers, it has been necessary to make the cutout opening in the aircraft wider to accommodate laterally projecting components and/or somewhat higher to accommodate overhead projecting components while maintaining the necessary unobstructed ingress/egress opening in the aircraft. Compounding the foregoing problems is the requirement that such ingress/egress passenger doors in commercial aircraft be provided with deployable emergency evacuation systems and their associated actuating linkages.

As those skilled in the art are well aware, the prior art is replete with numerous patent disclosures dealing with the foregoing types of doors and their inherent problems. Exemplary patents which are representative of plug-type aircraft doors with associated deployable evacuation systems and of the type which are adapted to move upwardly along tracks into the interior of the aircraft fuselage are those disclosed in U.S. Pat. Nos. 4,125,235—Fitzgerald et al and 4,470,566—Fitzgerald, both of which are assigned to the assignee of the present invention.

Patents which typify outwardly opening plug-type doors of the type adapted to be rotated about either a vertical or an inclined hinge axis and which are, in effect, turned inside-out include U.S. Pat. Nos.: 2,997,751—McPherren; 3,051,280—Bergman et al; 3,791,073—Baker; 4,199,120—Bergman et al; and, 4,479,623—Maraghe et al. Reference to the Bergman et al and Baker patents, all of which are assigned to the assignee of the present invention, reveals the nature of the problem inherent with hinge mechanisms and associated actuating linkages which project into the ingress/egress cutout opening when the door is open; while the Maraghe et al patent, also assigned to the assignee of the present invention, is illustrative of the types of counterbalance systems that are required with such doors to enable on-board flight attendants to manipulate the doors along uphill paths.

Wilmer, U.S. Pat. No. 3,004,303 is of interest for its early disclosure of a rather rudimentary type of aircraft door of the type intended to move with translatory motion. The patent contemplates the use of a lower main hinge and an upper control member, each of which are pivotally connected at one end to the aircraft frame adjacent the ingress/egress opening and at their other ends to the approximate midpoint of the door, with the uppermost control member serving to maintain parallel movement of the door as it is translated to and from a fully opened position. It is believed that commercial aircraft employing translatory plug-type doors of the general type disclosed in the Wilmer patent have, of necessity, employed considerably more complex latching and locking mechanisms than shown in the patent.

Heinemann et al, U.S. Pat. No. 2,751,636, a patent assigned to the asignee of the present invention, discloses a similar translatory plug-type aircraft door construction, here employing upper and lower hinges defining an inclined hinge axis about which the door is translated, together with an overhead control linkage. The construction is such that when used with conventional narrow bodied commercial aircraft of the type presently being manufactured, the fuselage curvature prohibits disposition of the hinges for rotation about a vertical, or near vertical, hinge axis; and, consequently, this arrangement would further require rather sophisticated counterbalance systems and, in some instances, power assist systems.

Yet another patent illustrative of closures for aircraft ingress/egress openings which do not rotate is Russian Pat. No. 182,003, wherein a hatch closure is provided that is moved out of the ingress/egress opening and then moved sidewise along spatial runners.

Other patents of miscellaneous interest include Linderfelt, U.S. Pat. Nos. 3,085,297 and Allwright et al, 3,647,169.

SUMMARY OF THE INVENTION

An inward/outward movable plug-type aircraft passenger door including: (i) a hinge assembly and programming control mechanism therefor; (ii) a latch/unlatch mechanism; (iii) a pressure lock gate and actuating mechanism therefor; and (iv), a deployable emergency evacuation system and actuating linkages; is disclosed wherein the aircraft door is of the type adapted to be translated between a first fully closed and latched position and a second fully open position while being maintained essentially parallel to the plane containing the ingress/egress cutout opening in the fuselage at all intermediate door positions—i.e., the aircraft door is not pivoted or rotated about the hinge axis to, in effect, turn the door inside out, but, rather, is moved with translatory motion outward of the ingress/egress cutout opening in the fuselage to a fully open position where the door's inner skin is in facing relation to the fuselage outer skin. That is, the aircraft door remains in a plane essentially parallel to the plane it occupied when fully closed and latched during all portions of its movement between fully open and fully closed and latched positions. Moreover, the hinge assembly and all actuating mechanisms associated with the door are designed to minimize obstruction to the ingress/egress cutout opening, thereby permitting door designs which require significantly less dedication of fuselage and/or available bulkhead space to meet the specifications of commercial aircraft carriers. Indeed, doors manufactured in accordance with the present invention can, while permitting unobstructed ingress/egress openings of the same width as attainable with more conventional translatory door constructions, employ up to about 6 inches less dedicated fuselage space per door.

It is a general aim of the present invention to provide outwardly opening, plug-type, translatory aircraft doors of the foregoing type which are characterized by their simplicity of construction, are compact, are devoid of actuating mechanisms interconnecting the door and surrounding fuselage frame structure at the upper and lower ends of the door, and which require only minimal direct-coupled actuating linkages for latching/unlatching the door, lifting the door relative to the ingress/egress cutout opening, and/or for deploying door mounted emergency evacuation systems.

Another important objective of the present invention is the provision of an outwardly opening, plug-type, translatory aircraft door which permits of usage of a single, centrally located, hinge assembly permitting the door to be translated about a vertical, or near vertical, hinge axis, thereby minimizing the forces that must be manually imparted by either an on-board flight attendant or by externally located ground crew members to move the door between a fully closed and latched position and a fully opened position. An ancillary objective of the invention is the provision of an aircraft door of the foregoing type having a hinge assembly and programming control linkage therefor which permit such tranlatory door movement and which, at the same time, are characterized by their ability to support the door in cantilever fashion while simultaneously extending around the corner of a vertical fuselage frame member adjacent the door cutout opening without significantly obstructing the ingress/egress opening when the door is fully opened.

A further objective of the invention is the provision of a translatory, outwardly opening, plug-type aircraft door of the foregoing character which permits of a simple door structure consisting of continuous edge members, beams and skins and which can be utilized in ingress/egress cutout openings in the aircraft fuselage which do not require irregularities to accommodate either the hinge assembly and/or the actuating mechanisms for the door.

Another and more detailed objective of the invention is the provision of a simple, reliable, door construction of the foregoing type which readily permits of modification to accommodate power assist systems for aiding door opening under emergency evacuation conditions.

DESCRIPTION OF THE DRAWINGS

These and other objects and advantages of the present invention will become more readily apparent upon reading the following detailed description and upon reference to the attached drawings, in which:

FIG. 12 is a fragmentary, simplified, vertical cross-sectional view taken substantially along the line 12—12 in FIG. 3, here depicting the door mounted latch crank and the upper and lower door mounted guide rollers received within respective ones of a latch track and upper and lower guide tracks or cams mounted on the forward frame of the fuselage adjacent the ingress/egress fuselage cutout and illustrating the components in the positions occupied when the aircraft door is fully closed and in the latched condition; and, depicting also, the mutually engaged door-mounted and fuselage-mounted pressure stop fittings;

FIG. 13 is a fragmentary, simplified, vertical cross-sectional view similar to FIG. 12, but here taken substantially along the line 13—13 in FIG. 7, depicting the relative positions of: (i) the door mounted latch crank and the upper and lower door mounted guide rollers in respective ones of the frame mounted latch track and the frame mounted upper and lower guide tracks; and (ii), the door-mounted and fuselage-mounted pressure stop fittings, when the aircraft door is fully unlatched and lifted relative to the ingress/egress fuselage cutout;

FIG. 14 is a fragmentary plan view, partially in section and taken substantially along the line 14—14 in FIG. 1, here depicting the aircraft door hinge and programming linkage when the door is in the closed, but fully unlatched, position—i.e., after movement of the operating handle from the position shown in FIG. 1 to that shown in FIG. 7;

FIG. 15 is a fragmentary plan view, partially in section and similar to FIG. 14, but here depicting the aircraft door in the partially open position and, illustrating also in broken lines a conventional snubber mechanism for controlling the rate and extent of door opening and/or closing movement;

FIG. 16 is a fragmentary plan view, partially in section and similar to FIGS. 14 and 15, but here illustrating the aircraft door in the fully opened position;

FIG. 17 is a fragmentary, simplified, vertical cross-sectional view taken substantially along the line 17—17 in FIG. 14, here depicting details of the hinge lift arms and lift/lockout mechanism prior to full unlatching and lifting of the aircraft door;

FIG. 18 is a fragmentary, simplified, vertical cross-sectional view similar to FIG. 17, but here illustrating the aircraft door, lift arms and lift/lockout mechanism following complete unlatching and lifting of the door by shifting of the main door operating handle from the position shown in FIGS. 1-3 to the positon shown in FIG. 7;

FIG. 21 is a fragmentary, simplified, vertical sectional view taken substantially along the line 21—21 in FIG. 20, here depicting the aircraft door in the fully closed and latched position with the arming mechanism in the Disarmed condition;

FIG. 22 is a fragmentary, simplified, vertical cross-sectional view similar to FIG. 21, but here illustrating the aircraft door in the fully closed and latched condition with the emergency evacuation system Armed;

Figure 1:
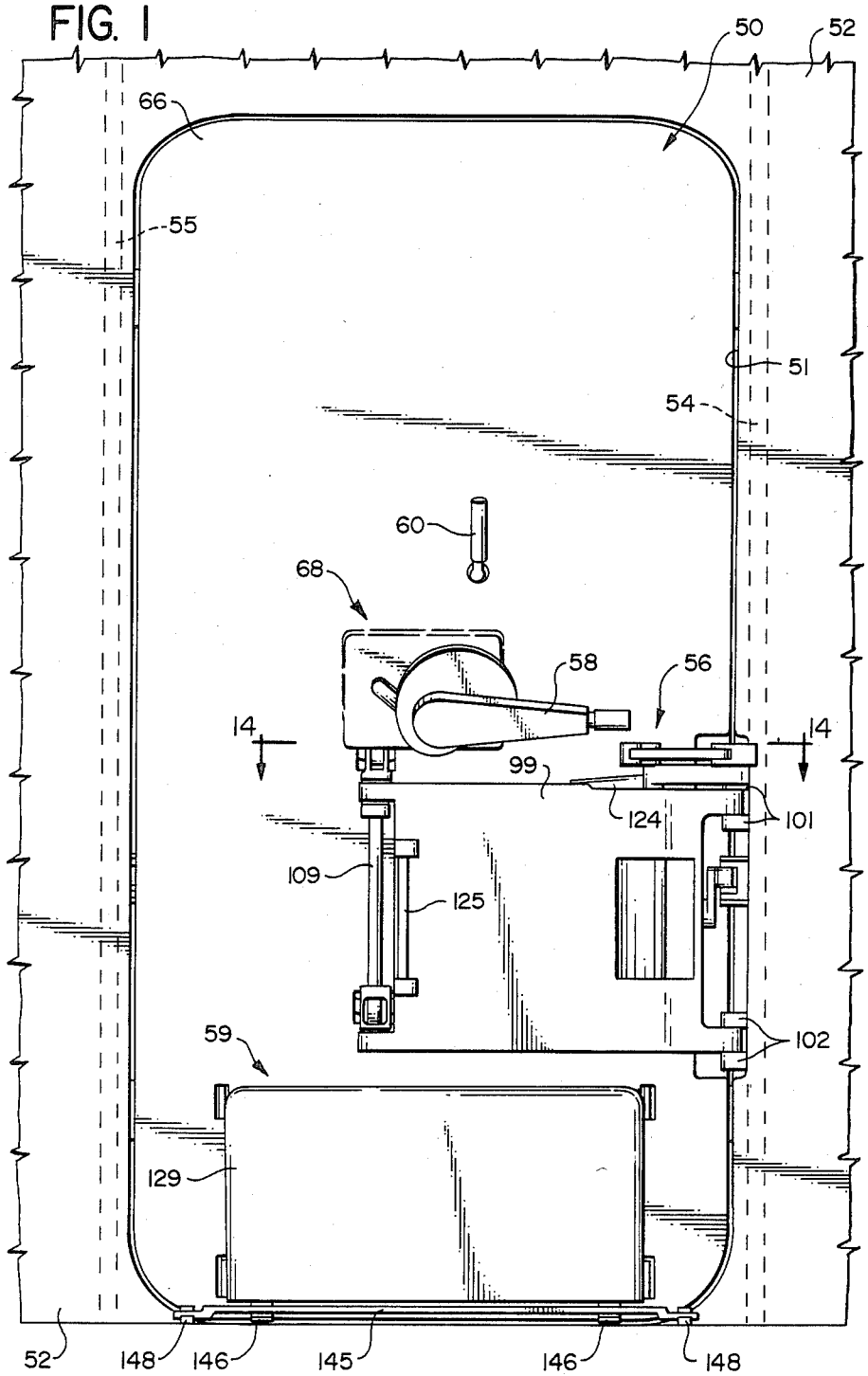
FIG. 1 is a fragmentary, interior, elevational view of a plug-type aircraft door and actuating mechanism therefor constructed in accordance with the present invention, with the door here being shown in the fully closed, latched position.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

A. General Environment (FIGS. 1, 2, 12 and 13)

Referring first to FIG. 1, there has been illustrated an outwardly opening, translatory, plug-type aircraft door, generally indicated at 50, of the type adapted to fit into and close an ingress/egress opening or cutout 51 formed in the aircraft fuselage 52 between fore and aft frame members depicted in broken lines at 54, 55. In the exemplary form of the invention depicted in FIG. 1, the door 50 includes a hinge assembly, generally indicated at 56, located generally centrally of the door for hingedly interconnecting the door to the fuselage frame structure—here, to the forward frame member 54—with freedom for translatory motion about a vertical, or near vertical, hinge axis. The door 50 further includes an interior manually operable handle 58 which can be used to latch/unlatch the door and, additionally, to lift the door slightly so as to permit opening thereof. As is conventional with aircraft doors of the type here illustrated, the door 50 is also provided with a recessed exterior door handle (not shown) which is interconnected to handle 58 in such a manner as to permit opening and/or closure of the door from either the passenger cabin by an on-board flight attendant or from outside the aircraft by ground personnel. Finally, and as is common with aircraft doors of the type employed in commercial passenger aircraft, the door 50 includes a deployable emergency evacuation system, generally indicated at 59, comprising a deployable and inflatable escape chute or slide (not shown) for permitting evacuation of passengers and crew members from the aircraft under emergency conditions. Such emergency evacuation system 59 is either Armed or Disarmed by the on-board flight attendant by means of an arming lever 60.

Figure 2:
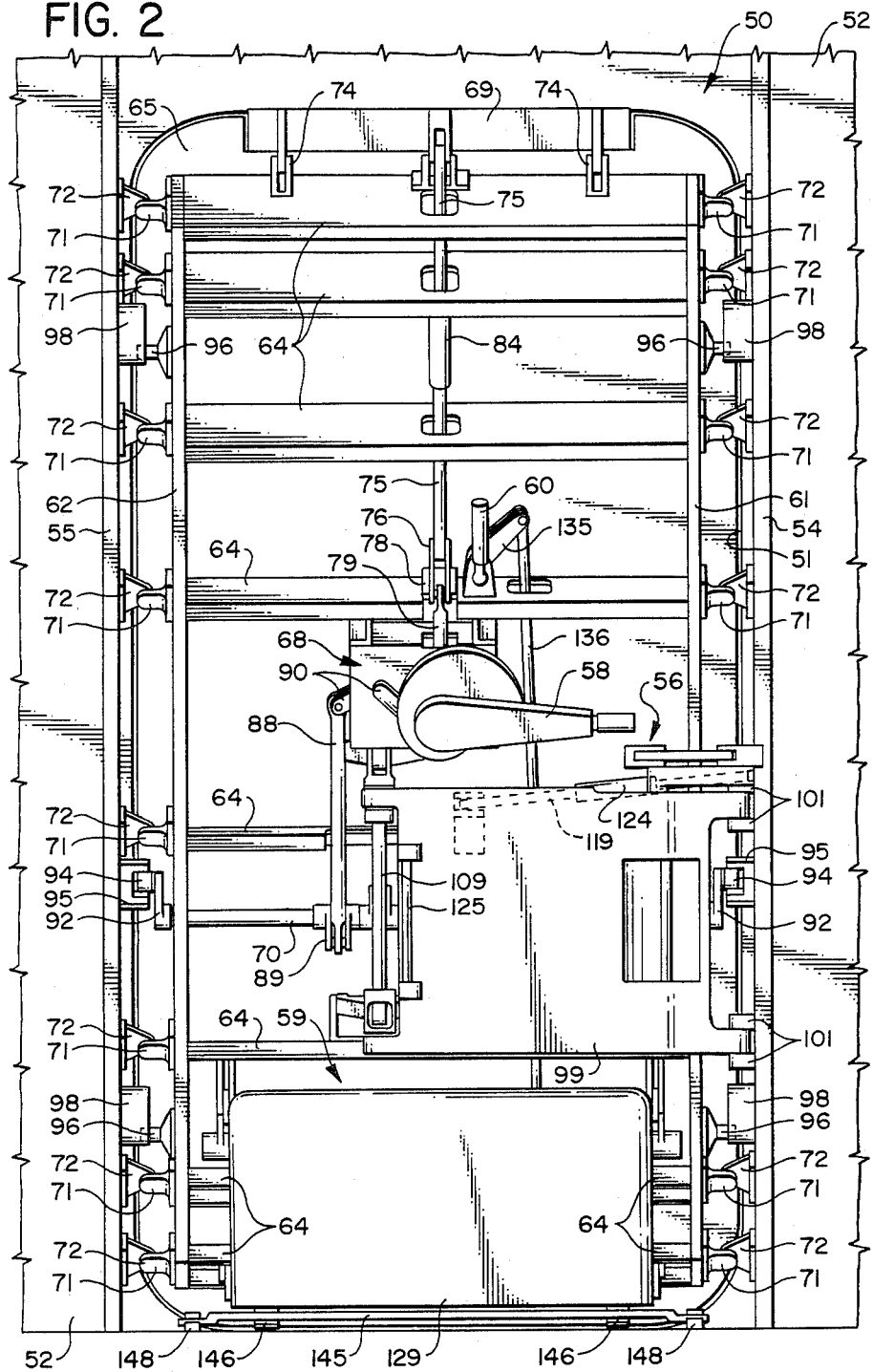
FIG. 2 is a fragmentary, interior, elevational view similar to FIG. 1 and also illustrating the aircraft door in the fully closed, latched position, but here depicting the door with the interior door skin or bulkhead removed so as to expose certain of the actuating linkages.

To facilitate an understanding of the present invention, the door 50 and surrounding fuselage structure shown in FIG. 1 have been illustrated in FIG. 2 with the inner cabin and door bulkheads or skins removed so as to expose the interior structure of the door and surrounding frame. Thus, as here shown, it will be observed that the door 50 comprises a pair of continuous force and aft parallel vertical edge members 61,62 interconnected by a plurality of transverse beams 64 to which are attached an outer skin 65 and an inner skin (not shown in FIG. 2, but illustrated at 66 in FIG. 1). The interior manually operable handle 58, as well as the exterior operating handle (not shown), are connected through a handle box mechanism, generally indicated at 68 in FIG. 2, and a suitable control actuating linkage assembly to be described in greater detail below, to a pressure lock gate 69 and a latch torque tube 70. The functions and operation of the pressure lock gate 69 are described hereinbelow in more detail in connection with FIGS. 3 through 6, 9 and 10; while the door latch/unlatch mechanism associated with the latch torque tube 70 is thereafter described in conjunction with FIGS. 5 through 13.

In order to properly seat the aircraft door 50 within the ingress/egress opening 51 and to permit transfer of pressure loads on the door to the aircraft fuselage structure 52 when the door is closed and latched, the exemplary structure is provided with a plurality of cooperable mating door and fuselage stop fittings 71,72, as best illustrated by reference to FIGS. 2 and 12 conjointly. More particularly, a plurality of door stop fittings 71 are fixedly mounted on, and project fore and aft from, the pair of continuous fore and aft parallel vertical door edge members 61,62—there being one door stop fitting 71 at each end of each transverse beam 64; and, since there are eight (8) such transverse beams 64 in the illustrative door structure, there are a total of sixteen (16) door stop fittings 71 with eight (8) projecting from the forward edge member 61 towards the forward frame member 54 and eight (8) projecting rearwardly between the aft door edge member 62 towards the aft frame member 55. Similarly, eight (8) mating fuselage stop fittings 72 are formed on each of the fuselage frame members 54,55 and positioned so as to be in load transmissive, cooperable, mated engagement with respective ones of the door stop fittings 71 when the aircraft door 50 is closed, fully seated, and latched.

B. Pressure Lock Gate 69 and Operating Mechanism (FIGS. 3-6, 9 and 10)

Figure 9:
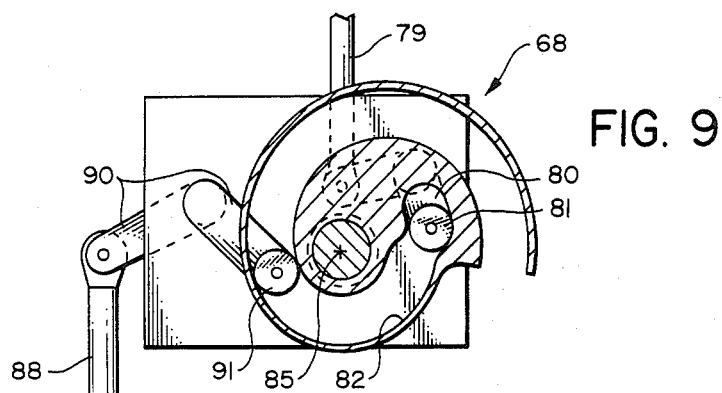
FIG. 9 is a highly simplified, fragmentary, sectional view taken substantially along the line 9—9 in FIG. 4, here depicting an exemplary camming mechanism for interconnecting the main door operating handle to the pessure lock gate and to the latch torque tube associated with the door latch/lift system, with the parts here shown in their relative positions when the aircraft door is fully closed and latched with the pressure lock gate in the closed condition.

The pressure lock gate 69 serves a number of important functions such, for example, as: (i) providing a means to permit interior cabin pressurization while at the same time permitting equalization of interior and exterior cabin pressure in those instances when interior cabin pressure is less than ambient pressure; (ii) preventing opening of the aircraft door whenever the passenger cabin is pressurized at greater than 1.0 psi; and (iii), providing a means for preventing unintentional upward door movement during in-flight operations should the door's latch cranks which are mounted on the latch torque tube 70 and/or the frame mounted latch tracks break. To this end, and as best illustrated by first referring to FIGS. 3, 4 and 9 conjointly, it will be observed that the pressure lock gate 69 is pivotally mounted on the uppermost transverse door beam 64 by means of a pair of brackets 74; and, further, the pressure lock gate 69 is coupled to the door's main operating handle 58 by means of a first upper control link 75 having its uppermost end coupled to the gate 69 and its lowermost end coupled to one end of a control lever 76 pivotally mounted centrally thereof on bracket 78 to a transverse door beam 64 and coupled at its opposite end to the uppermost end of a second lower control link 79. As best shown in FIG. 9, the lowermost end of the second control link 79 is coupled to one end of a bell crank 80 pivotally mounted on the handle box assembly 68, while the opposite end of the bell crank 80 is provided with a laterally projecting cam roller 81 or follower received within a cam groove 82 formed in the handle box assembly 68 and rotatable with the handle 58.

Figure 3:
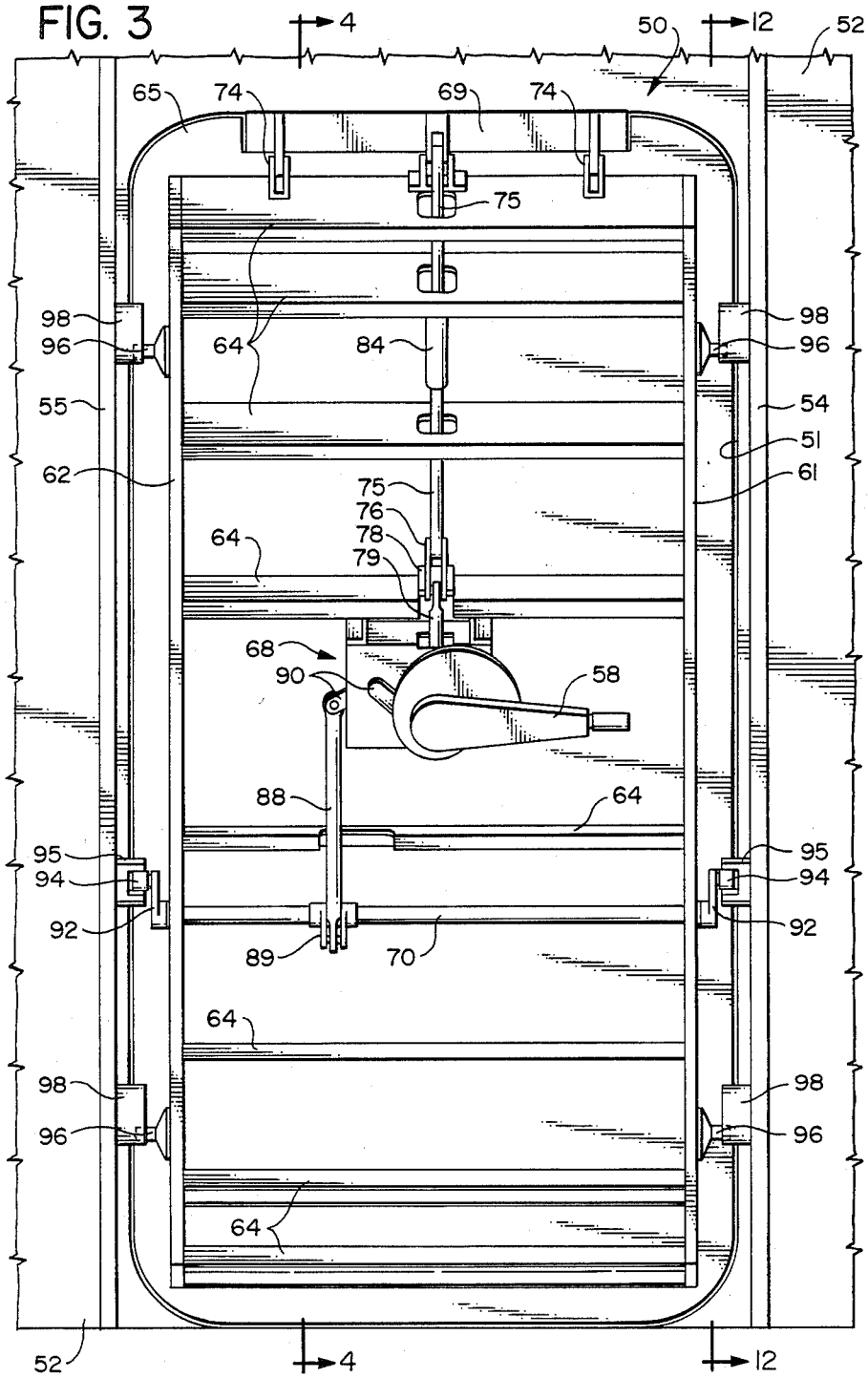
FIG. 3 is a fragmentary, interior, elevational view similar to FIG. 2, but here depicting the door with the hinge assembly, deployable emergency evacuation system and arming mechanism removed for pruposes of simplification.
Figure 4:
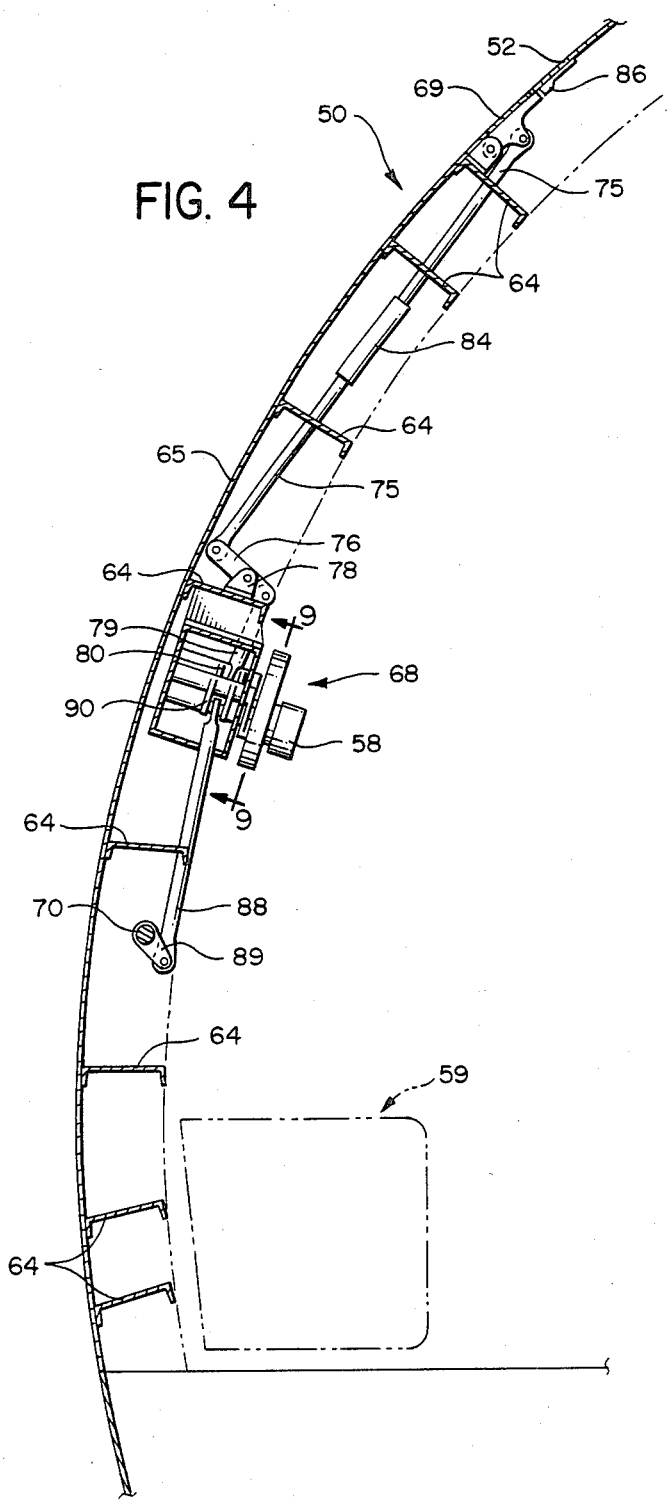
FIG. 4 is a fragmentary, simplified, vertical cross-sectional view taken substantially along the line 4—4 in FIG. 3, with parts removed for purposes of clarity, here illustrating the aircraft door in the fully closed, latched position and particularly depicting portions of the actuating linkages associated with the pressure lock gate and with the door latch/lift mechanism.

The arrangement is such that when the aircraft door 50 is fully closed and latched—i.e., when the door components are in the position shown in FIGS. 3, 4 and 9—the lower control link 79 is in its lowermost position as shown in FIGS. 4 and 9, thus pivoting control lever 76 in a clockwise direction as viewed in FIG. 4 and shifting the upper control link 75 to its uppermost position so as to pivot the pressure lock gate 69 in a counterclockwise direction to its fully closed position. Under these conditions, should the passenger cabin be depressurized, a conventional spring cartridge assembly 84 associated with the upper control link 75 serves to permit the pressure lock gate 69 to pivot inwardly and open due to higher exterior pressure conditions, thereby insuring that gate 69 functions as a negative pressure relief door for the passenger cabin.

Figure 5:
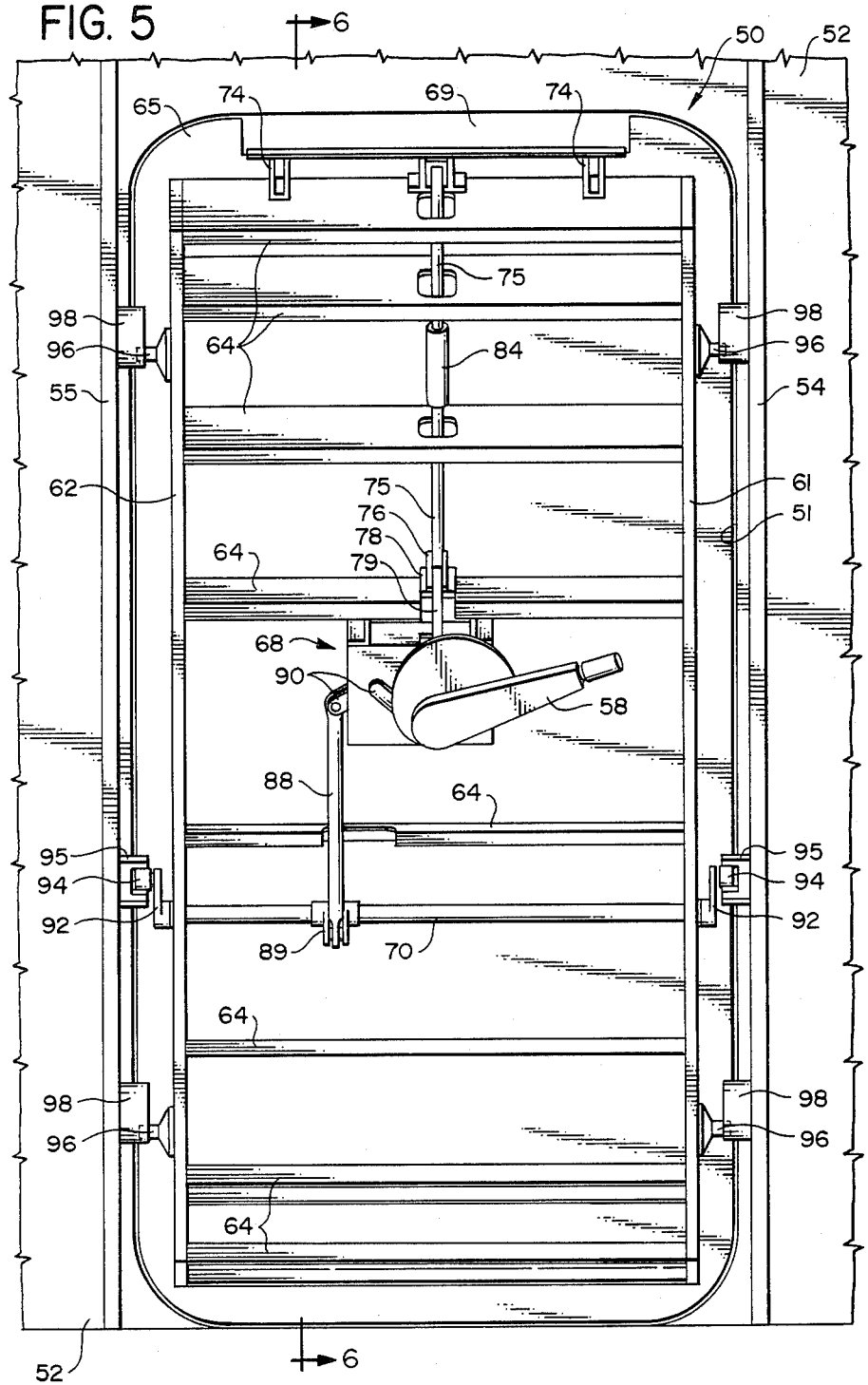
FIG. 5 is a fragmentary, interior, elevational view of the aircraft door and actuating components depicted in FIG. 3, but here illustrating the door with the main operating handle having been rotated (in a counter-clockwise directon as viewed in the drawing) a sufficient distance to open the pressure lock gate, but with the door still in the closed and latched position.
Figure 6:
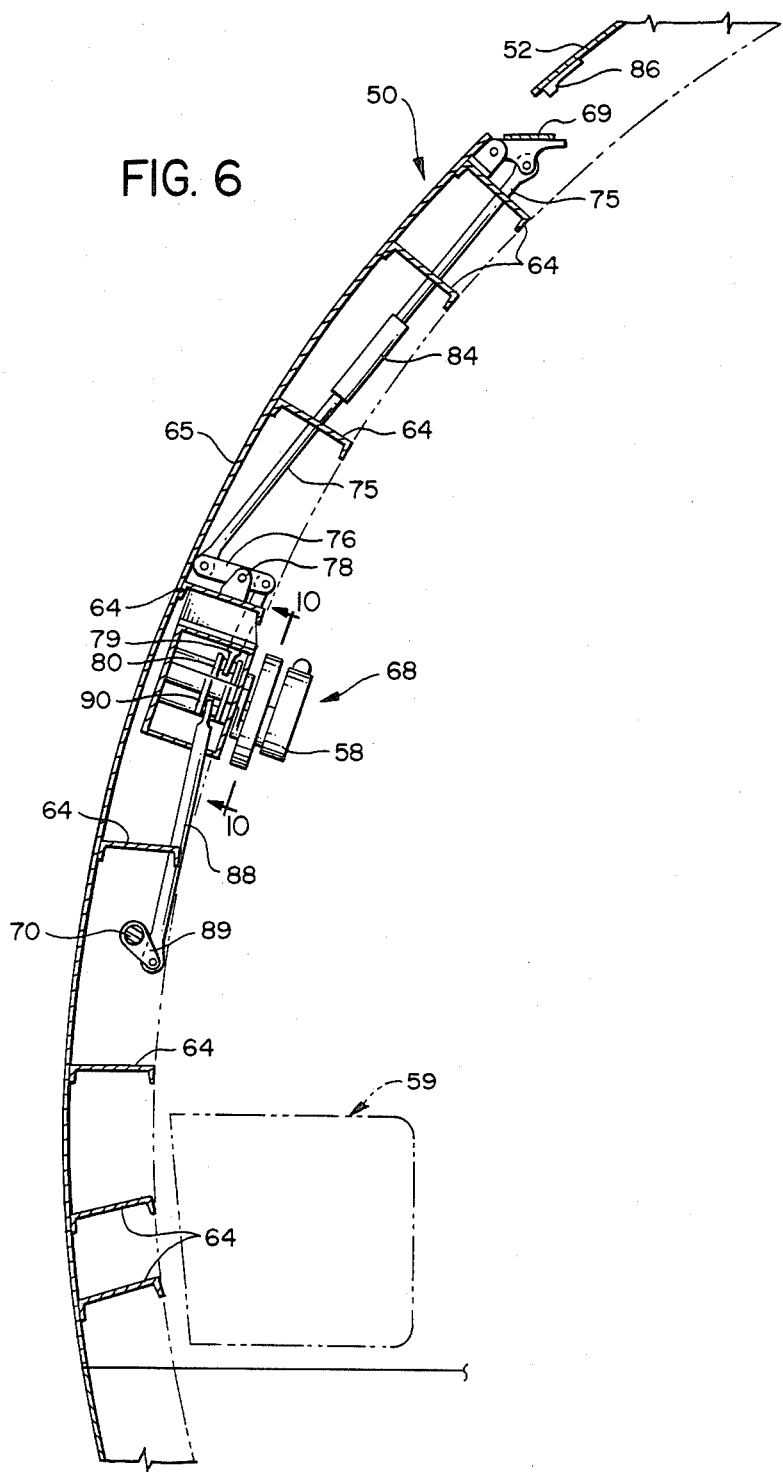
FIG. 6 is a fragmentary, simplified, vertical cross-sectional view similar to FIG. 4, but here taken substantially along the line 6—6 in FIG. 5 and depicting the pressure lock gate in the open position.
Figure 7:
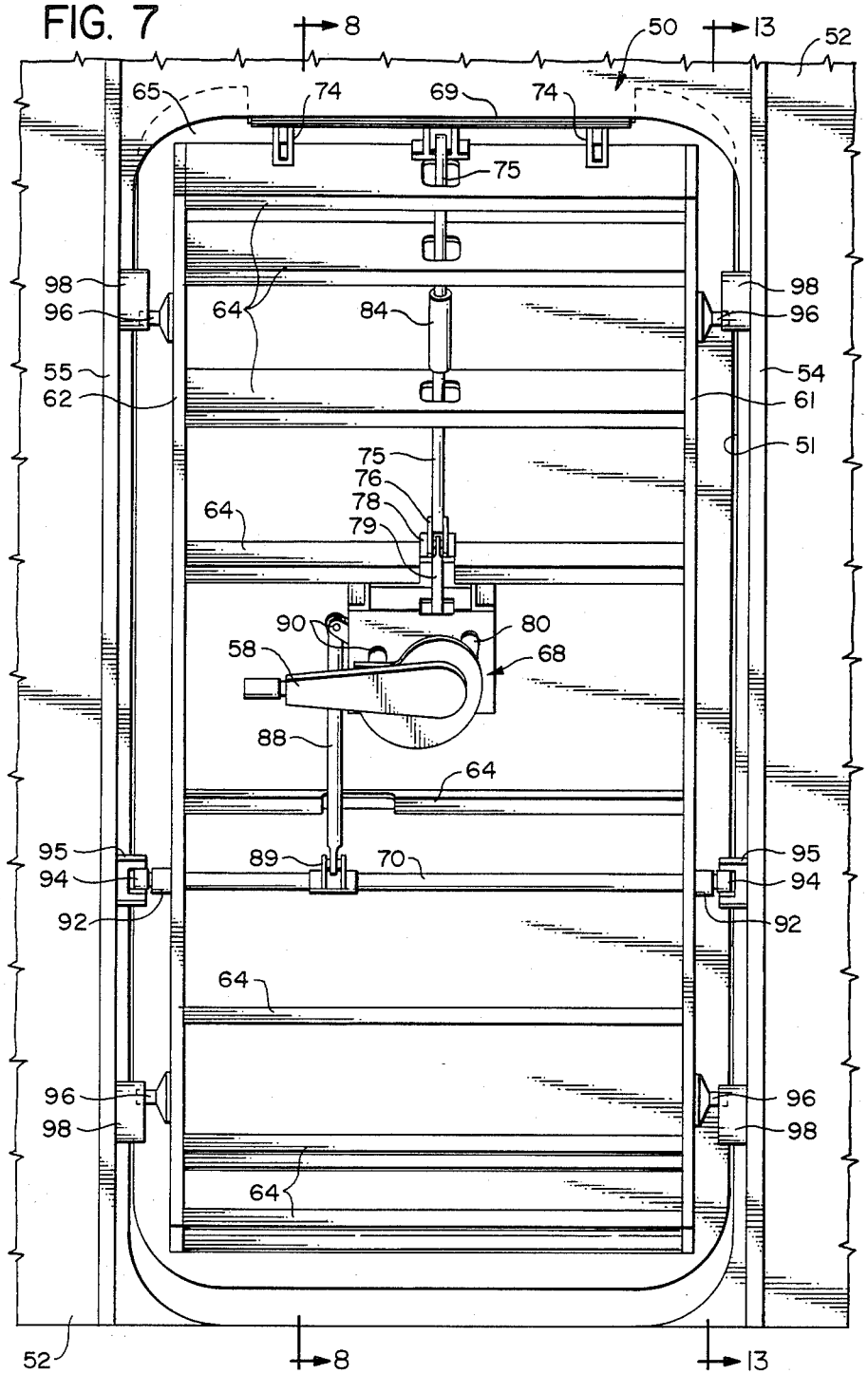
FIG. 7 is a fragmentary, interior, elevational view similar to FIGS. 3 and 5, but here illustrating the main operating handle having been moved approximately 180° from the fully closed position shown in FIG. 3 to a fully open position wherein the aircraft door is unlatched and lifted slightly out of the ingress/egress cutout in the aircraft fuselage.
Figure 8:
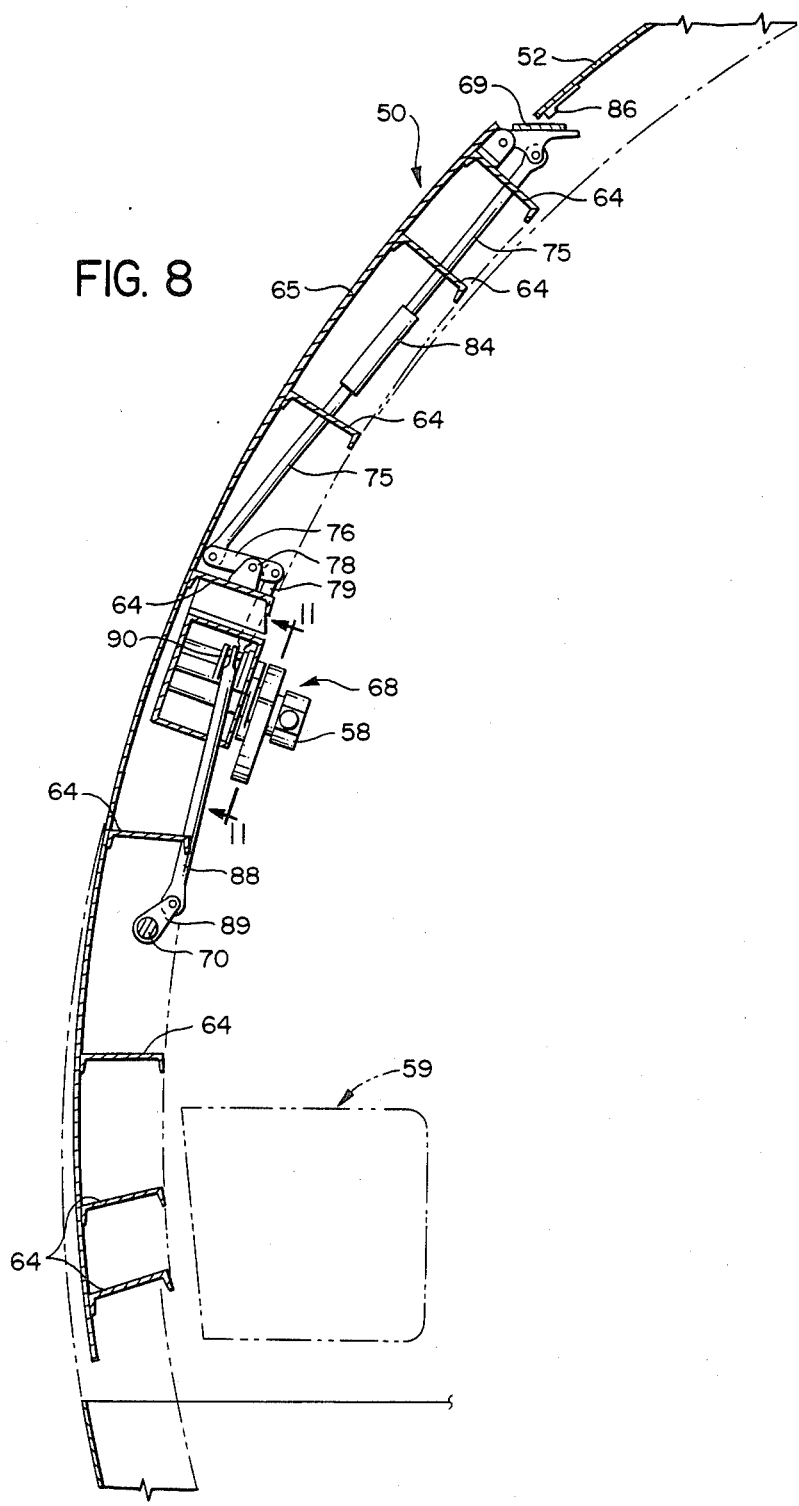
FIG. 8 is a fragmentary, simplified, vertical cross-sectional view similar to FIGS. 4 and 6, but here taken substantially along the line 8—8 in FIG. 7.
Figure 10:
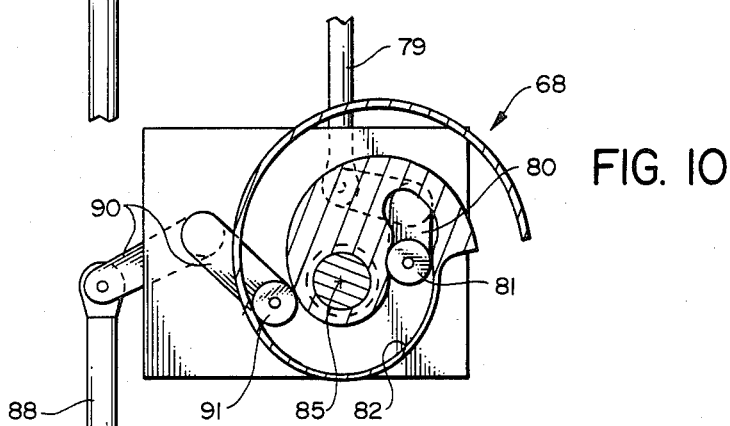
FIG. 10 is a simplified, fragmentary, sectional view similar to that shown in FIG. 9, but here taken substantially along the line 10—10 in FIG. 6 and depicting the exemplary camming mechanism components in their respective relative positions when the aircraft door is closed and latched, but when the pressure lock gate has been opened.
Figure 11:
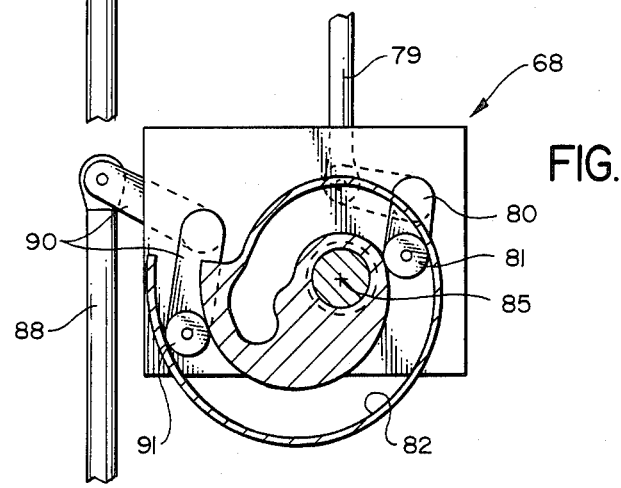
FIG. 11 is a fragmentary, vertical sectional view similar to FIGS. 9 and 10, but here taken substantially along the line 11—11 in FIG. 8 and depicting the camming mechanism when the aircraft door is fully unlatched and lifted slightly with respect to the fuselage ingress/egress cutout.
Figure 19:
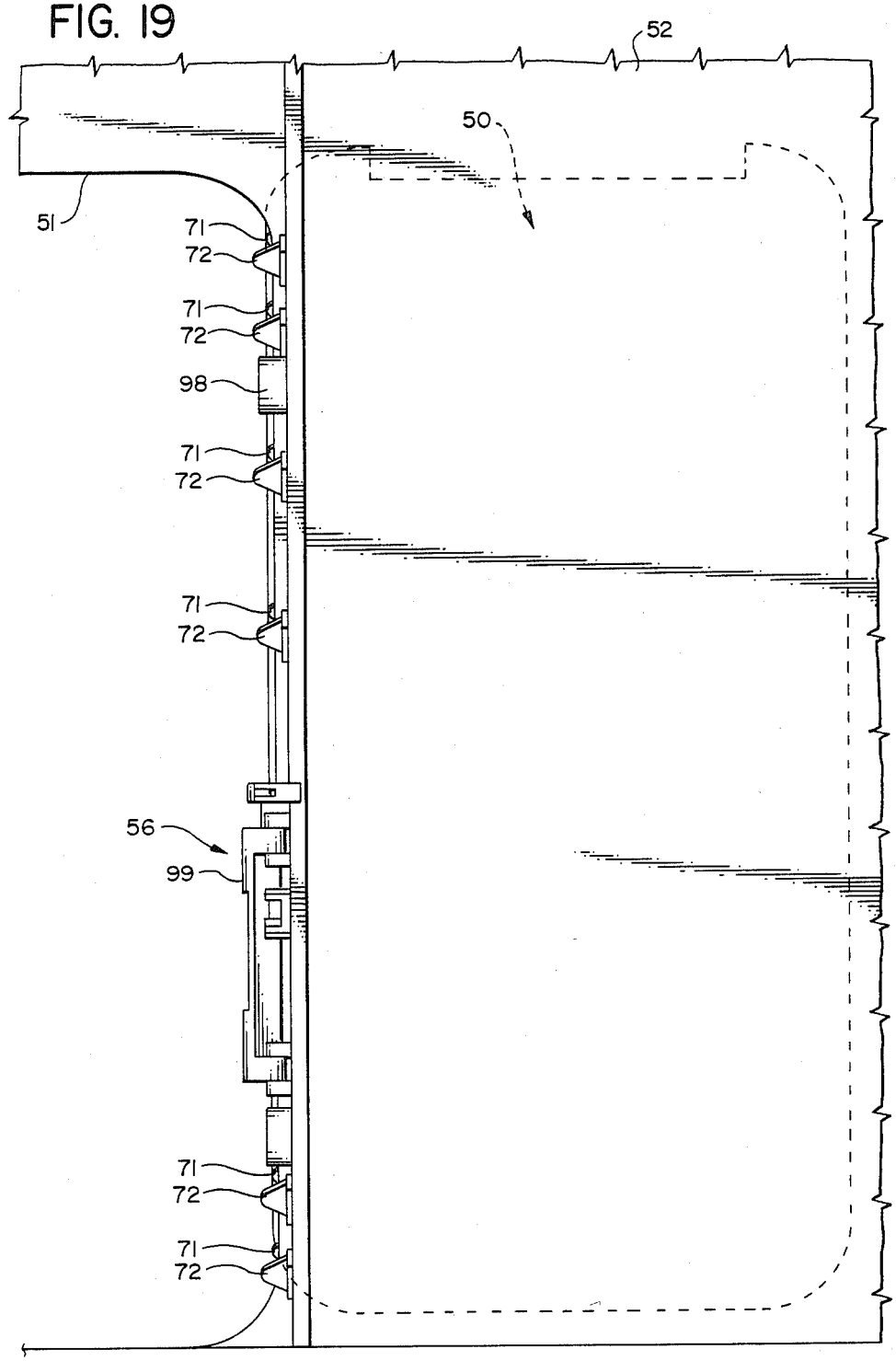
FIG. 19 is a highly simplified, fragmentary, vertical interior elevational view of a portion of the ingress/egress fuselage cutout when the aircraft door is in the fully opened position, here illustrating particularly the virtual complete absence of operating and/or actuating linkages and/or components extending into the cutout opening.

Contrasting the relative positions of the pressure lock gate 69 operating components as depicted in FIGS. 3, 4 and 9 when the gate 69 is closed with their relative positions shown in FIGS. 5, 6 and 10 when the gate is open (for reasons other than pressure equalization when the passenger cabin is depressurized), it will be observed that during the initial stages of a door opening cycle [whether initiated by an on-board flight attendant using the manually operable internal door handle 58 or by ground personnel actuating the external door handle (not shown)], the operating handle 58 is manually rotated slightly—about 10°—in a counterclockwise direction from the position shown in FIG. 3 to that shown in FIG. 5. As the handle 58 is rotated, the cam assembly depicted in FIG. 9 is simultaneously rotated about the axis 85 of handle rotation from the position shown in FIG. 9 to that depicted in FIG. 10, thus forcing the cam roller or follower 81 to move downwardly and to the left towards the axis of rotation 85 from the position shown in FIG. 9 to that shown in FIG. 10. As a consequence, the bell crank 80 is rotated in a clockwise direction about its point of pivotal connection to the handle box assembly 68, thus raising the second lower control link 79 and causing the control lever 76 to pivot in a counterclockwise direction from the position shown in FIG. 4 to that depicted in FIG. 6. The foregoing action serves to pull the first upper control lever 75 downwardly, pivoting the pressure lock gate 69 inboard about its pivotal connection to the door frame from the closed position shown in FIG. 4 to the open position shown in FIG. 6. During this entire period of time—i.e., as the main control handle 58 is moved approximately 10° from the position shown in FIG. 3 to that shown in FIG. 5, the aircraft door 50 remains in its fully seated, closed and latched position.

Referring to FIG. 4, it will be observed that one or more steps 86 are fixedly mounted on the aircraft frame structure immediately above the pressure lock gate 69 and are positioned so as to prevent upward movement of the gate—and, therefore, of the door 50—when the pressure lock gate 69 is closed. And, while not illustrated in the drawings, those skilled in the art will appreciated that suitable and completely conventional limit switches may be provided which are coupled to a remote warning light or other alarm in the cockpit for indicating when the pressure lock gate 69 is other than fully closed, thus providing an indication to the cockpit when the aircraft door 50 is not closed and latched.

C. Door Latching/Unlatching Mechanism (FIGS. 5–13)

In order to latch and/or unlatch the aircraft door 50, the manually operable internal door handle 58 (as well as the external handle, not shown) is coupled to the transversely extending latch torque tube 70 which is journaled for rotation in, and extends through, the fore and aft continuous door edge members 61,62 by means of a control link 88 coupled at its lower end to a torque tube crank 89 splined or otherwise affixed to the latch torque tube 70 for rotationally driving the latter; while the control link 88 is coupled at its upper end to one end of a bell crank 90 (FIGS. 9–11) pivotally mounted on the handle box assembly 68 and having a laterally projecting cam roller or follower 91 received within cam groove 82 generally diametrically opposite the cam roller 81 associated with the pressure lock gate operating linkage previously described. Referring to FIGS. 9 and 10, it will be noted that during rotation of the control handle 58 through the initial portion of its rotating cycle—i.e., approximately the first 10° of handle rotation—as the cam roller 81 is moved downwardly and to the left in groove 82 from the position shown in FIG. 9 to that shown in FIG. 10, cam roller 91 remains substantially equidistant from the axis 85 of the handle/cam rotation and, therefore, dwells with bell crank 90 remaining in the same position. However, as the handle 58 is rotated further in a counterclockwise direction from the position shown in FIG. 5 (with the pressure lock gate 69 open and the door 50 latched) to that shown in FIG. 7—i.e., through an additional angle of about 170°—the profile of the cam groove 82 is such that cam roller 91 is moved downwardly and to the left away from the axis 85 of handle/cam rotation, thus rotating bell crank 90 in a clockwise direction as viewed in the drawings from the position shown in FIG. 10 to that shown in FIG. 11, thereby raising control link 88 and causing rotation of the latch torque tube 70 in a counterclockwise direction from the position shown in FIG. 6 to that shown in FIG. 8. Moreover, during the latter portion of door handle 58 movement from the position shown in FIG. 5 to that shown in FIG. 7, the profile of the cam groove 82 is such that the cam roller 81 associated with the pressure lock gate actuating linkage remains substantially equidistant from the axis 85 of handle/cam rotation and, consequently, dwells with the bell crank 80 remaining stationary as the camming mechanism shifts from the position shown in FIG. 10 to that depicted in FIG. 11. As a consequence, the pressure lock gate 69 remains open.

While the exemplary form of the invention has herein been illustrated and described in conjunction with a camming mechanism having a single cam groove 82 and a pair of cam rollers 81,91 received therein, those skilled in the art will appreciate that other arrangements can be provided. For example, the single cam groove 82 can be replaced with independent cam grooves or tracks, each of which can be selectively and independently profiled to produce the desired sequential actuation of: (i) the pressure lock gate 69; and (ii), the latching/unlatching mechanism. Alternatively, the bell cranks 80,90 can be formed with cam tracks which are cooperatively engaged with cam followers on the rotatable portions of the handle box 68.

Referring to FIGS. 5 and 12 which depict the aircraft door 50 in the fully seated, closed and latched condition, it will be observed that the free extremities of the latch torque tube 70 journaled in and extending through the continuous door edge members 61,62 have nonrotatably mounted thereon a pair of latch cranks 92, each of which include a latch roller 94 received in respective ones of fore and aft latch tracks 95 respectively mounted on the fore and aft fuselage frame members 54,55. Thus, the arrangement is such that as the door handle 58 is moved from the position shown in FIG. 5 to that shown in FIG. 7, the counterclockwise rotation imparted to the latch torque tube 70 serves to rotate the latch cranks 92 in a counterclockwise direction from the position shown in FIG. 12 to that shown in FIG. 13. Since the latch rollers 94 are mounted in latch tracks 95 which are fixed to the vertical frame members 54,55 at the fore and aft ends of the ingress/egress door openings 51, it will be appreciated that as the latch torque tube 70 is rotated, the door 50 will be raised by a distance substantially equal to the effective length of the latch cranks 92—in a practical situation, by a distance of approximately 2 inches. Such upward door movement is, of course, permitted because at this point in a door opening cycle, the pressure lock gate 69 is open and free to move upwardly within the ingress/egress opening from the position shown in FIG. 6 to that shown in FIG. 8. Moreover, it has been found that the tremendous mechanical advantage available from the linkage described above will readily permit opening of iced-over doors 50 by either ground personnel or on-board flight attendants having only limited physical strength.

In carrying out the present invention, and as best illustrated in FIG. 12, it will be noted that when the aircraft door 50 is fully seated, closed and latched, the latch cranks 92 are positioned such that the latch rollers 94 are approximately 10° over-center with respect to the axis of the latch torque tube 70—i.e., the latch cranks 92, rather than extending upwardly along a true vertical, project slightly inboard. As a consequence, in the event that any forces attempt to displace the aircraft door 50 in an upward direction off the mutually engaged door and fuselage pressure stop fittings 71,72, interaction between the over-center latch rollers 94 and the upper surface of the latch tracks 95 will—in the absence of intentional door unlatching as a result of rotation of handle 58 and latch torque tube 70 in the manner previously described—serve, via cranks 92, to bias the latch torque tube 70 in a clockwise direction as viewed in FIG. 12, thus biasing the door 50 in a downward direction into its fully seated, closed and latched condition with the door and fuselage pressure stop fittings, 71,72 mutually engaged. Although not illustrated in the drawings, those skilled in the art will appreciated that suitable and completely conventional over-travel stops may be provided for limiting rotation of the latch torque tube 70 by more than a preselected amount—say, for example, approximately 5°—beyond the fully latched and fully unlatched positions shown in FIGS. 12 and 13, respectively. As a consequence of the foregoing arrangement, together with the pressure lock gate system previously described, the aircraft door 50 of the present invention is provided with an essentially "fail-safe" locking system which insures that the door will not come off of its mutually engaged door and fuselage pressure stop fittings 71,72 during normal in-flight conditions.

As will be best observed by reference to FIGS. 5, 7, 12 and 13 conjointly, it will be noted that the door 50 is provided with lower and upper, fore and aft projecting latch pins 96 which are received within inverted, generally L-shaped guide tracks 98 and which serve to permit releasable latching of the aircraft door 50. Thus, when the door is in a fully seated and latched condition such as depicted in FIGS. 5, 6 and 12, the latch pins 96 are retained captive within the lower ends of the inverted L-shaped guide tracks 98, thereby preventing opening of the door. On the other hand, as the door handle 58 is rotated from the position shown in FIG. 5 to that shown in FIG. 7, rotation of the latch torque tube 70 serves to rotate the latch cranks 92 in the manner previously described from the position shown in FIG. 12 to that shown in FIG. 13, thus lifting the latch pins 96 to the upper end of the inverted L-shaped guide tracks 98 from the position shown in FIG. 12 to that depicted in FIG. 13. In this position, the door 50 may be freely moved out of the ingress/egress opening since the latch rollers 94 and latch pins 96 are free to move out of the latch tracks 95 and guide tracks 98, respectively, and since the door-mounted pressure stop fittings 71 have been raised approximately 2" and will, therefore, clear the fuselage-mounted pressure stop fittings 72.

D. Hinge Assembly 56 and Controllable Translatory Door Motion (FIGS. 1, 2 and 14–19)

Turning now to a specific hinge assembly construction of the type embodying features of the present invention and as shown in detail in FIGS. 1, 2 and 14 through 19, it will be noted that the illustrative hinge assembly 56 includes a relatively large hinge member 99 which, when viewed in plan as shown in FIGS. 14–16, is of generally L-shaped configuration, having: (i) a relatively short hinge arm 100 mounted at its free extremities in vertically spaced brackets 101,102 (FIG. 1) fixedly secured to the forward fuselage frame member 54 for rotation about a fixed vertical, or near vertical, hinge axis 104; and (ii), an integral, relatively long hinge arm 105 mounted at its free extremities on links 106,108 (best shown in FIGS. 17 and 18) pivotally connected to the aircraft door 50 for rotation about a second vertical, or near vertical, hinge axis 109 parallel to hinge axis 104. Thus, the arrangement is such that while hinge member 99 is vertically fixed relative to the fuselage frame structure—e.g., relative to forward frame member 54—it is hingedly connected thereto for rotation about an essentially vertical hinge axis 104. At the same time, the aircraft door 50, while hingedly connected in cantilever fashion to the free extremity of the hinge member 99 for rotation about a second essentially vertical hinge axis 108, is free to move up and down during door unlatching and latching operations. That is, assuming the door 50 is in a fully seated, closed and latched position, it will be recognized that as the door handle—e.g., inner handle 58—is rotated from the position shown in FIG. 5 to that shown in FIG. 7, rotational motion is imparted to the latch torque tube 70 which, through cooperative engagement between the latch rollers 94 on latch cranks 92 and the latch tracks 95 on the forward and aft frame members 54,55, serves to lift the door 50 by a distance of approximately 2 inches from the position shown in FIG. 6 to that depicted in FIG. 8. As the door 50 moves up from a latched position as shown in FIG. 17 to an unlatched position as shown in FIG. 18—i.e., as the latch torque tube 70 rotates in a counterclockwise direction as viewed in the drawings—such vertical motion is accommodated by the links 106,108 which are pivotally connected at one end to the door 50 and at their opposite ends to the relatively long hinge arms 105 on hinge member 99.

It is to be noted that during unlatching of the door 50, the weight of the door—which is initially supported only by the latch tracks 95 when the door is fully seated and latched (see, FIG. 12)—is supported by both the latch tracks 95 (FIG. 13) and a load carrying link 110 (FIG. 17) when the door is raised and unlatched but prior to opening thereof by movement out of the ingress/egress opening 51. To accomplish this, the load carrying link 110 is coupled at its lower end to the latch torque tube 70 and at its upper end to link 106. Thereafter, when the door 50 is pushed out of the ingress/egress opening 51 and the load is no longer supported in whole or in part by the latch tracks 92 (FIGS. 7, 12 and 13), the door is prevented from dropping by virtue of link 110 which, through link 106 on the hinge assembly 56, serves to support the door diretly from the fuselage frame member 54 in an elevated position approximately 2 inches above the position of the door when closed and fully latched. As best illustrated by reference to FIGS. 17 and 18 conjointly, it will be noted that link 110 is coupled to link 106 by means of a pin 111 passing through the link 106 and through an elongated slot 112 formed in link 110. Thus, when the door 50 is fully seated, closed and latched, as shown in FIG. 17, the pin 111 resides in the lower end of slot 112 and, consequently, no load is carried by link 110; but, rather, the full weight of the door is supported by the latch cranks 92, latch rollers 94 and latch tracks 95. However, when the door 50 is unlatched and raised as shown in FIG. 18, the pin 111 resides in the upper end of slot 112; and, consequently, a load supporting path including link 110 is provided for supporting the entire weight of the door 50 from the foreward fuselage frame member 54.

In carrying out the present invention, provision is made for controlling the rotational attitude of the aircraft door 50 as it is being shifted between fully opened and fully closed positions. To this end, a programming mechanism is provided for maintaining the aircraft door 50 in a plane essentially parallel to the plane containing the ingress/egress opening 51 at all door positions ranging between the fully closed and the fully opened positions—i.e., for imparting translatory motion to the door as contrasted with rotational motion. In this connection, and as best illustrated in FIG. 15, the exemplary programming mechanism includes: (i) a bell crank 114 pivotally secured at 115 to the hinge member 99 at the juncture between the short hinge arm 100 and the long hinge arm 105; (ii) a first control lik 116 pivotally connected at one end to one end of bell crank 114 and at its opposite end to a bracket 118 mounted on the forward fuselage frame member 54 immediately above hinge brackets 101; and (iii), a second control link 119 pivotally connected at one end to the opposite end of bell crank 114 and at its opposite end to a bracket 120 secured to the door 50.

The arrangement is such that the short hinge arm 100, first control link 116, that portion of the bell crank 104 intermediate the control link 116 and pivot point 115, and the space between the hinge axis 104 and the point of pivotal connection between control link 116 and bracket 118, define a first essentially perfect parallelogram, here indicated by the dotted line 121, at all positions of the door 50, as best shown in FIG. 14 where the door is fully closed, FIG. 15 where the door 50 is partially open, and FIG. 16 where the door 50 is fully open. Similarly, the long hinge arm 105, control link 119, that portion of bell crank 114 intermediate the link 119 and pivot point 115, and the space between hinge axis 109 ad the point of pivotal connection between bracket 120 and link 119, define a second essentially perfect parallelogram, here identified by the dash-dot line 122, at all positions of the door 50 as best shown in FIGS. 14–16.

As previously described, during a door unlatching operation, the aircraft door 50 is lifted slightly—about 2"—and moves slightly inboard at its lower end (Cf., e.g., FIGS. 17 and 18); while during a door latching operation, the door 50 moves downwardly about 2" and its lower end moves lightly outwardly. Such essentially vertical door movement relative to a vertically fixed hinge element 99 is, as previously indicated, readily accommodated by virtue of the pivotal connection between the free extremity of long hinge arm 102 and the door frame which is provided by links 106,108. However, in order for the programming mechanism defined by links 116,119 and bell crank 114 to accommodate such relative movement between the door 50 and the hinge member 99, provision is preferably made for permitting controlled extension of link 119. To this end, link 119 includes a conventional extension-type spring cartridge assembly 124 which maintains link 119 at an essentially fixed predetermined length when the door 50 is in its raised position such that the linkage describes a perfect parallelogram as indicated by the dash-dot line 122 in FIGS. 14–16. However, when the door 50 is closed, fully seated, and latched, the spring cartridge assembly 124 permits of slight elongation of link 119; and, as a consequence, the parallelogram indicated by the dash-dot line 122 in FIG. 14 will, in fact, be somewhat imperfect as indicated by the slope of link 119 depicted in FIG. 2. The provision of the spring cartridge assembly 124 thus serves to reduce prelaods in the programming mechanism and the tendency of the aircraft door to rotate within the ingress/egress cutout 51 in a clockwise direction (as viewed in FIG. 2) during latching of the door 50 and/or in a counterclockwise direction during unlatching of the door.

As a consequence of the foregoing construction, as the aircraft door 50 is translated from a fully closed unlatched position to a fully opened position—i.e., as it moves progressively from the position shown in FIG. 14 through that shown in FIG. 15 and to that shown in FIG. 16—the hinge assembly 56 readily moves around the corner defined by the forward fuselage frame member 54; and, those hinge assembly components defining the dotted line parallelogram 121—viz., short hinge arm 100, bell crank 114 and control link 116—assume a nearly lineal configuration, best shown in FIG. 16, closely abutting the fuselage forward frame member 54 and projecting out of the ingress/egress opening 51 along a line essentially normal thereto. As will be noted upon inspection of FIGS. 16 and 19, the foregoing arrangement results in an ingress/egress opening 51 which is essentially devoid of hinge elements and actuating and/or control mechanisms projecting into the rectilinear boundaries of the opening 51 when the door is fully open; and, further, there is no need for overhead control link assemblies. As depicted in the drawings, the hinge assembly 56 may be provided with an additional handle 125 which can be used by either an on-board flight attendant or by ground personnel to assist in initiating door closing movement.

Moreover, although not illustrated or described herein in considerable detail, those skilled in the art will appreciate that aircraft doors used for passenger ingress/egress purposes are generally relatively heavy, normally weighing up to several hundred pounds or more; and, as a consequence, it is generally desirable to provide a snubber mechanism which can take any of several well-known conventional forms for retarding or braking the movement of the door and preventing damage due to inertial movement. For example, as shown diagrammatically in broken lines in FIG. 15 only, a hydraulic snubber mechanism 126 may be provided having one end pivotally connected to a bracket 128 secured to the forward inboard edge of the door frame and its opposite end secured to the relatively long hinge arm 105. In those instances where the snubber mechanism 126 is intended to function solely as a snubber, it will commonly employ a single piston (not shown) for transferring hydraulic fluid through a cylinder orifice so as to provide a controlled retarding force irrespective of the direction of door movement. In those instances where it is desirable to employ the snubber mechanism 126 to provide power assist and to aid in door opening under emergency conditions, the snubber mechanism 126 may include tandem pistons (not shown)—one for snubbing utilizing hydraulic fluid flowing through a cylinder orifice; and, one employing compressed gas or the like for powering the door to the open position. Such emergency power-assist door operation can be initiated in any suitable and/or conventional manner which forms no part of the present invention and is not, therefore, either illustrated or described in detail herein. Suffice it to say that persons skilled in the art will appreciate that a POWER-ON switch (not shown) can be provided for permitting electrical activation of the power-assist system by an on-board flight attendant; or, since most carriers prefer non-electrical mechanical actuation systems which are less prone to malfunction, the cam groove 82 (FIGS. 9-11) can be profiled to permit an additional 15° movement of the interior door handle 58—i.e., an additional counterclockwise rotation of handle 58 approximately 15° beyond the door unlatched position shown in FIG. 7—without further rotation of the latch torque tube 70. Under normal non-emergency operating conditions, an adjustable stop (not shown) would be provided for preventing such additional rotation of handle 58 during a door opening operation; but, when the arming lever 60 (FIGS. 1 and 2) is shifted to the Armed position for activating the emergency evacuation system 59, such motion can be used to move the adjustable stop (not shown), thereby permitting the on-board flight attendant to rotate the interior handle 58 an additional 15° to mechanically initiate a power-assist operation through any suitable linkage (not shown) interconnecting the handle 58 and tandem piston snubber mechanism 126.

E. Emergency Evacuation System 59 (FIGS. 20-25)

In order to comply with both federal regulations and the specifications of commercial carriers, aircraft doors 50 of the type utilized to permit passenger ingress and/or egress to and/or from commercial aircraft are normally required to include a deployable, and generally inflatable, emergency evacuation system which can be deployed to permit rapid evacuation of the aircraft under emergency conditions. As previously indicated, such a system has been generally depicted at 59 in, for example, FIGS. 1, 2 and 20-25. As best shown in FIGS. 21 and 22, the exemplary emergency evacuation system 59 includes a slide pack 129 which is carried by, and releasably secured to, a slide pack board 130 in any suitable manner (not shown in the drawings). For example, the slide pack 129 may be releasably secured to the slide pack board 130 by means of: (i) magnets; (ii) fabric fasteners—for example, a male-type fabric fastener element secured to one of the slide pack 129 or slide pack board 130, and a female-type fabric fastener secured to the other of the two components; (iii) bayonet-type fittings; (iv) a load-carrying support flange or lip on the lower edge of the slide pack board 130; and/or (v), combinations of two or more of the foregoing.

Figure 25:
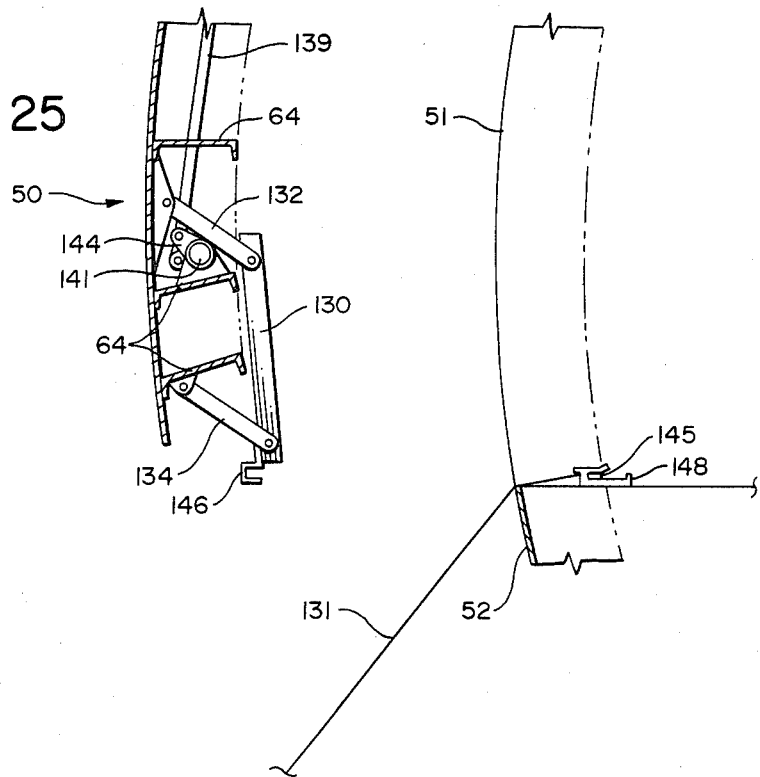

Basically, the arrangement is such that when the emergency evacuation system 59 is Disarmed, the slide pack 129 and slide pack board 130 move as a unit with the aircraft door—i.e., as the door 50 is unlatched and raised approximately 2" in the manner previously described, the slide pack 129 and slide pack board 130 are also raised approximately 2"; and, as the door 50 is opened and moved from the position shown in FIG. 14 to that shown in FIG. 16, the slide pack 129 and slide pack board 130 move out of the ingress/egress opening 51 with the door. On the other hand, under emergency evacuation conditions when the door 50 is opened while the emergency evacuation system 59 is Armed, provision must be made for separating the slide pack 129 from the slide pack board 130 as the door 50 is opened, thereby permitting the slide pack 129 to move outwardly through the ingress/egress opening 51 and deployment of the slide 131 carried therein as best shown in FIG. 25.

Figure 20:
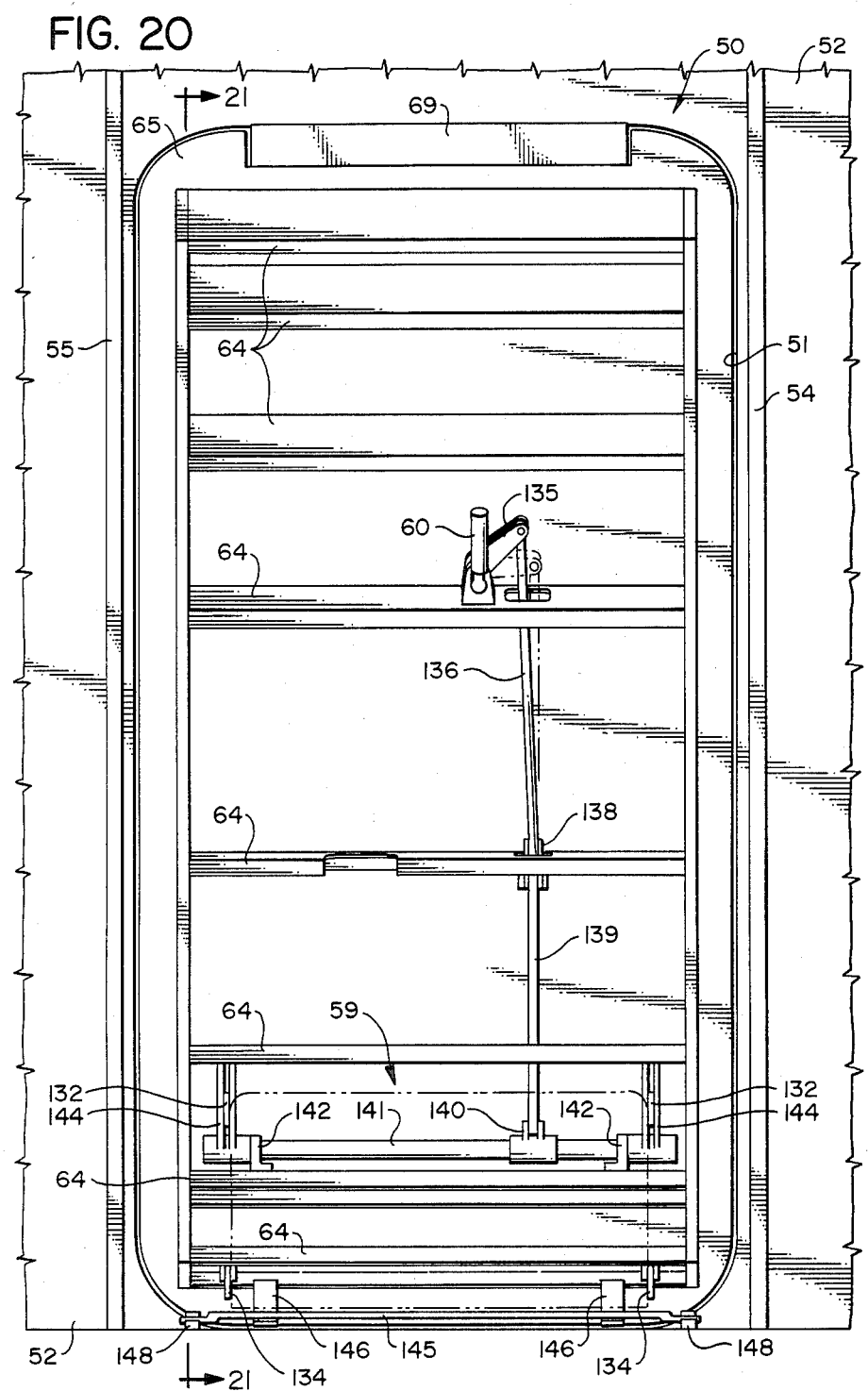
FIG. 20 is a fragmentary, interior, elevational view similar to FIG. 2, but here illustrating the door with the operating handle, pressure lock gate, hinge assembly, latch torque tube and associated actuating linkages removed for purposes of clarity, depicting particularly the arming lever and actuating linkage associated therewith for arming the emergency evacuation system prior to flight operations, here illustrating the arming linkage in solid lines in the Disarmed state and in dash-dot lines in the ARMED state.

To this end, and with reference first to FIGS. 20 and 21 conjointly which are illustrative in solid lines of operation under Disarmed conditions, it wil be noted that the slide pack board 130 (and, therefore, the slide pack 129) is supported from the door frame structure by a pair of upper links 132 and a pair of lower links 134, each having one end pivotally secured to the slide pack board 130 and its opposite end pivotally secured to the door 50. Arming lever 60 is provided with a crank arm 135 (best illustrated in FIG. 20) having its free end connected to the upper end of an upper control link 136 which, in turn, is connected at its lower end to one end of a bell crank 138 pivotally mounted on a trasverse door beam 64. The opposite end of bell crank 138 is coupled to the upper end of a second lower control link 139 having its lowermost end coupled to a crank arm 140 fixedly mounted on a transversely extending slide pack torque tube 141 journaled for rotation in brackets 142 carried by a transverse door beam 64 located somewhat above the bottom of the door and intermediate the points of pivotal connection of the upper and lower pairs of links 132, 134 to the door. A pair of actuating arms 144 are mounted on slide pack torque tube 141 for rotation therewith and are positioned to engage and support respective ones of the pair of upper pivotal support links 132 when the emergency evacuation system 59 is in the Disarmed condition. Under these conditions, as the door 50 is unlatched and moved upwardly a distance of approximately 2" in the manner previously described, the actuating arms 144 engage the undersides of pivotal links 132 as shown in FIG. 21 and prevent pivotal movement thereof; and, as a consequence, the slide pack board 130 and the slide pack 129 releasably secured thereto also move upwardly a distance of approximately 2" to a position where the emergency evacuation system 59 is free to move outwardly through the ingress/egress opening 51 with the door 50 as the latter is translated to its fully open position.

In carrying out this aspect of the present invention, one end of the slide 131 (best shown in FIG. 25) is secured to a girt bar 145 which, prior to separation of the slide pack 129 from the slide pack board 130, is carried in a pair of inwardly facing, C-shaped, girt bar support brackets 146 mounted on and extending below the lower edge of the slide pack board 130 with the girt bar 145 extending beyond the fore and aft ends of the slide pack 129 and being received within fore and aft floor-mounted girt bar fittings 148. Thus, the arrangement is such that when the emergency evacuation system is Disarmed—i.e., when the control links are in the position shown in FIG. 21—as the door 50 is unlatched and moved upwardly a distance of approximately 2", the slide pack board 130 also moves upwardly due to coaction of the actuating arms 144 and the upper pivotal links 132 which are restrained from pivotal movement. Consequently, the girt bar 145 carried in the support brackets 146 on the slide pack board 130 is lifted upwardly a distance of approximately 2" which is sufficient to permit the girt bar 145 to move freely outward with the door 50 through the ingress/egress opening 51 with the girt bar 145 clearing and passing freely over the floor fittings 148.

Figure 23:
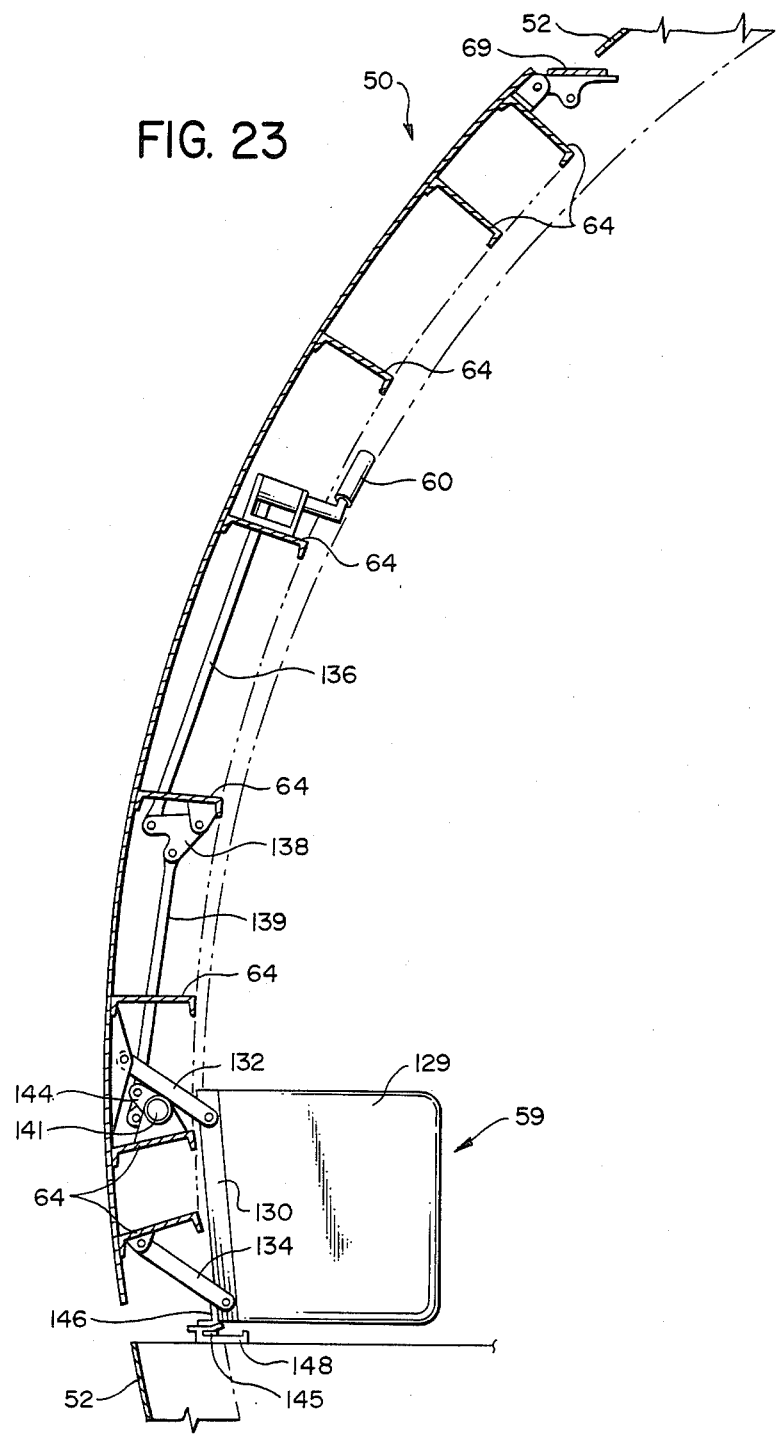
FIG. 23 is a fragmentary, simplified, vertical cross-sectional view similar to FIG. 22, but here illustrating the position of the emergency evacuation system arming linkages in the Armed condition when the aircraft door is fully unlatched and lifted with the evacuation slide or chute released from the door fittings, and secured to the floor fittings in readiness for deployment, but wherein the door has not yet been moved out of the ingress/egress fuselage cutout during door opening movement.
Figure 24:
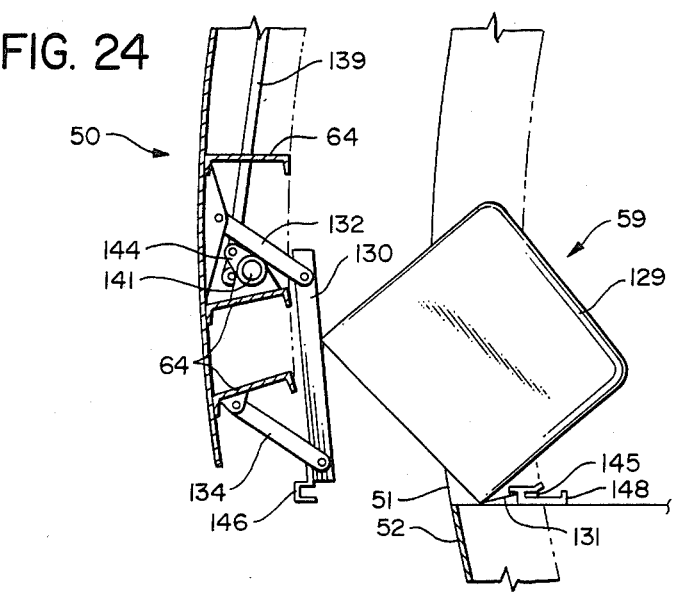
FIG. 24 is a fragmentary, simplified, vertical cross-sectional view similar to the lower portion of FIG. 23, but here illustrating the aircraft door in the partially open position with the evacuation slide or chute released from the door fittings, secured to the floor fittings, and partially deployed; and, FIG. 25 is a fragmentary, simplified, vertical cross-sectional view similar to FIG. 24, here depicting the aircraft door in the fully open position and the emergency evacuation slide or chute fully deployed.

In normal operation, the on-board flight attendant will Arm the emergency evacuation system 59 prior to departure of the aircraft from the terminal departure gate; and, the system will remain Armed until such time as the aircraft is parked at the arrival gate. To accomplish this, the on-board flight attendant need only manually turn the arming lever 60 (in a clockwise direction as viewed in FIG. 20) through an angle of approximately 45°, thus rotating crank 135 from the solid line position shown in FIG. 20 to the dash-dot position shown. This serves to shift the upper control link 136 downwardly from the position shown in FIG. 21 to that shown in FIG. 22; and, as a consequence, bell crank 138 is pivoted in a counterclockwise direction, shifting lower control link 139 downwardly from the position shown in FIG. 21 to that shown in FIG. 22 and thereby rotating the slide pack torque tube 141 in a counterclockwise direction as viewed in the drawings. As the torque tube 141 rotates, the actuting arms 144 splined or otherwise affixed thereto, are shifted from the position shown in FIG. 21 (where they engage the undersurface of pivotal links 132) to that shown in FIG. 22 (where the actuating arms no longer impede pivotal movement of the links 132). Therefore, as the aircraft door 50 is unlatched in the manner previously described and moved upwardly a distance of approximately 2" from the position shown in FIG. 22 to that shown in FIG. 23, the weight of the slide pack 129 and slide pack board 130 (which are mounted in cantilever fashion on the inboard ends of pivotal links 132, 134) serves to maintain the slide pack 129 and slide pack board 130 in their lowermost positions, with the girt bar 145 still positioned within the floor fitting 148; and, this is accomplished by virtue of the ability of the pivotal links 132, 134 to freely pivot (in a clockwise direction as viewed in FIGS. 22 and 23) about their points of pivotal connection to the door frame structure. Moreover, as the door 50 moves upwardly, the clockwise rotational motion of the links 132, 134 serves to shift the links from the position shown in FIG. 22 to that shown in FIG. 23 when the door 50 is fully unlatched and raised; and, consequently, the girt bar 145 is moved slightly outboard where it is captively retained by the floor fittings 148 and prevented from moving upwardly. Thus, as the door 50 is progressively translated out of the ingress/egress opening 51 from a closed but raised position as shown in FIG. 23 to a partially open position (FIG. 24) and, ultimately, to a fully open position (FIG. 25), the girt bar support brackets 146 carried by the slide pack board 130 move outwardly away from the girt bar 145 which is now captively retained in the floor fittings 148, thus producing sufficient force to separate the slide pack 129 from the slide pack board 130 and permitting deployment and inflation of the slide 131 in an otherwise conventional manner.

Those skilled in the art will appreciate that there has herein been disclosed a simple, yet highly effective, mechanism for hingedly mounting relatively heavy aircraft passenger doors on the frame structure of the aircraft fuselage in such a manner that an outwardly opening plug-type door can be easily moved out of and into the ingress/egress cutout opening in an aircraft fuselage by either on-board flight attendants or ground personnel without having to turn the door inside out and without having to move the heavy door in an uphill direction during any portion of door opening and/or closing motion; yet, wherein the ingress/egress cutout opening is essentially devoid of inwardly projecting hinge and/or actuating mechanisms or components which tend to reduce the effective width and/or height of the unimpeded passenger access opening in the aircraft. Rather, the door, which is supported in cantilever fashion on a hinge assembly for movement about a vertical or near-vertical hinge axis, is moved into and out of the ingress/egress cutout opening with translatory motion with the various actuating and hinge mechanism free to move around the corner defined by a vertical frame member bounding the cutout opening to positions outboard of the fuselage structure and either forward or aft of the cutout opening when the door is fully open.

What is claimed is:

1. An outward opening plug-type aircraft door of the type adapted to be mounted in an ingress/egress cutout opening formed in the aircraft fuselage and bounded by generally vertical fore and aft fuselage frame members, said door comprising, in combination:
   (a) means defining a generally L-shaped hinge element having a relatively short hinge arm and a relatively long hinge arm;
   (b) means for securing said relatively short hinge arm to one of the generally vertical fore and aft frame members bounding the ingress/egress cutout opening in the aircraft fuselage with freedom for rotation about a first generally vertical hinge axis;
   (c) an outwardly opening plug-type aircraft door dimensioned to be received in and to close the ingress/egress cutout opening in the aircraft fuselage, said door being mounted in cantilever fashion on the free extremity of said relatively long hinge arm for rotation about a second generally vertical hinge axis and with freedom for limited up and down vertical movement relative to said hinge element and the ingress/egress cutout opening in the aircraft fuselage;

(d) means defining a programming mechanism interconnecting said aircraft door, said hinge element and said one of the fore and aft fuselage frame members for controlling the rotational attitude of said aircraft door as the latter is shifted between fully closed and fully opened positions and for maintaining said aircraft door in a plane essentially parallel to the plane containing the ingress/egress cutout opening at all door positions, said programming mechanism defining means comprising:

(i) a first 4-bar linkage assembly defined by (1) said relatively short hinge arm; (2) bell crank defining means pivotally secured intermediate its opposite ends to said L-shaped hinge element at the juncture of said relatively short and said relatively long hinge arms; and (3), a first control link pivotally secured at one end thereof to one end of said bell crank defining means and pivotally secured at the opposite end thereof to said one of the generally vertical fore and aft frame members for rotation about a third generally vertical hinge axis parallel to and spaced from said first generally vertical hinge axis; and, (ii) a second 4-bar linkage assembly defined by (1) said relatively long hinge arm; (2) said bell crank defining means; and (3), a second control link pivotally secured at one end thereof to the other end of said bell crank defining means and pivotally secured at the opposite end thereof to said door for rotation about a fourth generally vertical hinge axis parallel to and spaced from said second generally vertical hinge axis;

with said first and second 4-bar assemblies being interconnected to one another by said bell crank defining means and being arranged such that when said aircraft door is in the fully opened position the components defining said first 4-bar linkage assembly lie in an essentially vertical plane immediately adjacent said one of the generally vertical fore and aft frame members bounding the ingress/egress cutout opening in the aircraft fuselage, the components defining said second 4-bar linkage assembly lie wholly outside the aircraft fuselage and either fore or aft of the ingress/egress cutout opening, and the ingress/egress cutout opening is essentially devoid of any obstructions when said aircraft door is in the fully open position;

(e) cooperable latch means mounted on the fore and aft vertical edges of said aircraft door and on the fore and aft generally vertical fuselage frame members bounding the ingress/egress cutout opening for selectively latching said aircraft door in a seated, fully closed and latched condition; and, (f) manually operable actuating means mounted on said aircraft door for lifting said aircraft door within the fuselage ingress/egress cutout opening a distance on the order of approximately two inches from a seated, fully latched and closed position to a raised unlatched and closed position and for lowering said aircraft door within the fuselage ingress/egress cutout opening a distance on the order of approximately two inches from a raised, unlatched and closed position to a seated, fully latched and closed position; whereby said aircraft door may be shifted between a seated, fully latched and closed position and a raised, unlatched and closed position by manual actuation of said actuating means; and, whereby said aircraft door, when in a raised, unlatched and closed position, can be manually shifted out of the ingress/egress cutout opening to a fully open position wherein said door is located outboard of the aircraft fuselage with the door's inner surface and the fuselage outer surface in facing relation with said door being maintained in a plane essentially parallel to the plane containing the ingress/egress cutout opening at all door positions intermediate a fully closed and fully opened position and with the ingress/egress cutout opening being substantially devoid of laterally projecting hinge and/or actuating components when said door is fully opened.

2. An outward opening plug-type aircraft door as set forth in claim 1 further including a pressure lock gate pivotally mounted on said door for permitting (i) interior cabin pressurization and (ii) equalization of interior and exterior cabin pressure when interior cabin pressure is less than ambient pressure; and, wherein said manually operable actuating means is coupled to said pressure lock gate for (iii) sequentially opening said gate and thereafter unlatching a fully seated latched door and (iv) sequentially latching an unlatched door and thereafter closing said gate, and (v) providing a positive stop to prevent upward movement of said door during flight.

3. An outward opening plug-type aircraft door as set forth in claim 1 wherein said cooperable latch means include an open-ended latch track mounted on each of the fore and aft fuselage frame members bounding the cutout opening and cooperable latch rollers projecting fore and aft from respective ones of the fore and aft edges of said door with freedom of movement outboard along said tracks during door opening movement and inboard along said tracks during door closing movement; and, wherein said manually operable actuating means include an inner main operating handle rotatably mounted on said door, a latch torque tube extending transversely across said door and journaled for rotation therein, said latach torque tube projecting beyond the fore and aft vertical edges of said door, fore and aft latch cranks mounted on respective ones of said fore and aft projecting portions of said torque tube, and first control linkage defining means drivingly interconnecting said handle and said torque tube for causing rotation of said torque tube during a portion of rotational movement manually imparted to said handle; and, wherein said latch rollers are mounted on respective ones of said fore and aft latch cranks; whereby rotational movement of said handle causes rotation of said torque tube and said latch cranks and, as a result of mutual coaction between said latch rollers and said latch tracks, said door is lifted during a door unlatching operation and lowered during a door latching operation by an amount equal to the effective length of said latch cranks.

4. An outward opening plug-type aircraft door as set forth in claim 2 wherein said cooperable latch means include an open-ended latch track mounted on each of the fore and aft fuselage frame members bounding the cutout opening and cooperable latch rollers projecting fore and aft from respective ones of the fore and aft edges of said door with freedom for movement outboard along said tracks during door opening movement and inboard along said tracks during door closing movement; and, wherein said manually operable actuating means include an inner main operating handle rotatably mounted on said door, a latch torque tube extending transversely across said door and journaled for rotation therein, said latch torque tube projecting beyond the fore and aft vertical edges of said door, fore and aft latch cranks mounted on respective ones of said fore and aft projecting portions of said torque tube, and first control linkage defining means drivingly interconnecting said handle and said torque tube for causing rotation of said torque tube during a portion of rotational movement manually imparted to said handle; and, wherein said latch rollers are mounted on respective ones of said fore and aft latch cranks; whereby rotational movement of said handle causes rotation of said torque tube and said latch cranks and, as a result of mutual coaction between said latch rollers and said latch tracks, said door is lifted during a door unlatching operation and lowered during a door latching operation by an amount equal to the effective length of said latch cranks.

5. An outward opening plug-type aircraft door as set forth in claims 3 or 4 wherein said latch cranks project slightly inboard of true vertical passing through said latch torque tube when said door is fully seated and latched whereby, in the absence of manual rotation of said handle, interaction between said latch rollers and said latch tracks serves to bias said latch torque tube towards a position wherein said door is in a fully seated and latched position.

6. An outward opening plug-type aircraft door as set forth in claims 1, 2, 3, or 4, further including means defining a compressible/extensible snubber mechanism coupled at one end to said door and at its opposite end to said L-shaped hinge element for providing a retarding force during door opening and door closing movement.

7. An outward opening plug-type aircraft door as set forth in claims 1, 2, 3, or 4, further including an emergency evacuation system having an emergency evacuation slide pack containing a deployable emergency escape slide releasably carried by said door, and manually operable means for selectively Arming/Disarming said system whereby when said system is DISARMED said slide pack moves with said door during all vertical, outward and inward door movement and when said system is Armed said slide pack is released from said door, secured to the aircraft fuselage, and deployed through the ingress/egress cutout opening as said door is opened.

8. An outward opening plug-type aircraft door as set forth in claim 7 wherein said emergency evacuation system includes a slide pack board, at least one pair of support links pivotally mounted at one end on said door and at the opposite end of said board, a slide pack torque tube carried by said door and journaled for controlled rotation therein, lift arms nonrotatably mounted on said slide pack torque tube and positioned to engage said at least one pair of support links when said system is Disarmed for preventing downward pivotal movement of said support links as said door is raised during a door unlatching operation, a manually operable arming lever mounted on said door, control linkage coupling said lever and said slide pack torque tube for imparting rotational movement to said torque tube when said arming lever is manually shifted between Armed and Disarmed positions, and floor-mounted fittings secured to the aircraft fuselage structure inboard of the fore and aft generally vertical fuselage frame members bounding the ingress/egress cutout opening for captively engaging and retaining one end of said slide contained within said slide pack when said system is Armed and said door is opened, and wherein said slide pack is releasably carried on said slide pack board; whereby, when said arming lever is manually shifted to the Armed position, rotational movement is imparted to said slide pack torque tube by said control linkage and said lift arms are rotated to positions permitting downward pivotal movement of said support links so that as said door is unlatched and raised from its fully seated closed position, the weight of said slide pack and said slide pack board causes said lift links to pivot, thereby captively engaging said slide within said floor fittings, and so that as said door is moved outwardly from the ingress/egress opening, said slide pack is stripped from its releasable connection to said board and is deployed outwardly through the cutout opening.

9. An outward opening plug-type aircraft door as set forth in claim 1 wherein said manually operable actuating means includes a support link for establishing a load path between said aircraft door and a fuselage frame member whereby when said aircraft door is in an opened position, the weight of said door is directly supported by the fuselage frame member.

10. An outward opening plug-type aircraft door of the type adapted to be mounted in an ingress/egress cutout opening formed in the aircraft fuselage and bounded by generally vertical fore and aft fuselage frame members, said door comprising, in combination:
(a) means defining a generally L-shaped hinge element having a relatively short hinge arm and a relatively long hinge arm;
(b) means for securing said relatively short hinge arm to one of the generally vertical fore and aft frame members bounding in the ingress/egress cutout opening in the aircraft fuselage with freedom for rotation about a first generally vertical hinge axis;
(c) an outwardly opening plug-type aircraft door dimensioned to be received in and to close the ingress/egress cutout opening in the aircraft fuselage, said door being mounted in cantilever fashion on the free extremity of said relatively long hinge arm for rotation about a second generally vertical hinge axis; and,
(d) means defining a programming mechanism interconnecting said aircraft door, said hinge element and said one of the generally vertical fore and aft frame members for controlling the rotational attitude of said aircraft door as the latter is shifted between fully closed and fully opened positions and for maintaining said aircraft door in a plane essentially parallel to the plane containing the ingress/egress cutout opening at all door positions, said programming mechanism defining means including: (i) a bell crank pivotally mounted on said L-shaped hinge element at the juncture between said relatively long and relatively short hinge arms, said bell crank defining a first crank arm having a length "a" and a second crank arm having a length "b"; (ii) a first control link pivotally connected at one end to the free extremity of said first crank arm and at its opposite end to said one of the generally vertical fore and aft frame members at a point located a distance "a" from said first generally vertical hinge axis; and (iii), a second control link pivotally connected at one end to the free extremity of said second crank arm and at its opposite end to said aircraft door at a point located a distance "b" from said second generally vertical hinge axis; whereby said relatively short hinge arm, first crank arm, first control link and the distance "a" intermediate said first generally vertical hinge axis and the point of pivotal connection between said first control link and said one of the generally vertical fore and aft frame members define a first parallelogram at all positions of said aircraft door ranging from a fully closed unlatched position to a fully opened position; and, said relatively long hinge arm, said second crank arm, said second control link and the distance "b" intermediate said second generally vertical hinge axis and the point of pivotal connection between said second control link and said door define a second parallelogram at all positions of said aircraft door ranging from a fully closed unlatched position to a fully opened position.

11. An outward opening plug-type aircraft door as set forth in claim 10 wherein said second control link includes resilient extendable/retractable means for permitting elongation of said second control link to accommodate vertical displacement of said door.

12. An outward opening plug-type aircraft door as set forth in claim 10 further including a pressure lock gate pivotally mounted on said door for permitting (i) interior cabin pressurization and (ii) equalization of interior and exterior cabin pressure when interior cabin pressure is less than ambient pressure; and, wherein said manually operable actuating means is coupled to said pressure lock gate for (iii) sequentially opening said gate and thereafter unlatching a fully seated latched door and (iv) sequentially latching an unlatched door and thereafter closing said gate, and (v) providing a positive stop to prevent upward movement of said door during flight.

13. An outward opening plug-type aircraft door as set forth in claim 10 further including means defining a compressible/extensible snubber mechanism coupled at one end to said door and at its opposite end to said L-shaped hinge element for providing a retarding force during door opening and door closing movement.

14. An outward opening plug-type aircraft door as set forth in claim 10, further including an emergency evacuation system having an emergency evacuation slide pack containing a deployable emergency escape slide releasably carried by said door, and manually operable means for selectively Arming/Disarming said system whereby when said system is Disarmed said slide pack moves with said door during all vertical, outward and inward door movement and when said system is Armed said slide pack is released from said door, secured to the aircraft fuselage, and deployed through the ingress/egress cutout opening as said door is opened.

15. An outward opening plug-type aircraft door as set forth in claim 10 wherein said emergency evacuation system includes a slide pack board, at least one pair of support links pivotally mounted at one end of said door and at the opposite end on said board, a slide pack torque tube carried by said door and journaled for controlled rotation therein, lift arms nonrotatably mounted on said slide pack torque tube and positioned to engage said at least one pair of support links when said system is Disarmed for preventing downward pivotal movement of said support links as said door is raised during a door unlatching operation, a manually operable arming lever mounted on said door, control linkage coupling said lever and said slide pack torque tube for imparting rotational movement to said torque tube when said arming lever is manually shifted between Armed and Disarmed positions, and floor-mounted fittings secured to the aircraft fuselage structure inboard of the fore and aft generally vertical fuselage frame members bounding the ingress/egress cutout opening for captively engaging and retaining one end of said slide contained within said slide pack when said system is Armed and said door is opened, and wherein said slide pack is releasably carried on said slide pack board; whereby, when said arming lever is manually shifted to the Armed position, rotational movement is imparted to said slide pack torque tube by said control linkage and said life arms are rotated to positions permitting downward pivotal movement of said support links so that as said door is unlatched and raised from its fully seated closed position, the weight of said slide pack and said slide pack board causes said lift links to pivot, thereby captively engaging said slide within said floor fittings, and so that as said door is moved outwardly from the ingress/egress opening, said slide pack is stripped from its releasable connection to said board and is deployed outwardly through the cutout opening.

16. An outward opening plug-type aircraft door of the type adapted to be mounted in an ingress/egress cutout opening formed in the aircraft fuselage and bounded by generally vertical fore and aft fuselage frame members, said door comprising, in combination:
  (a) means defining a generally L-shaped hinge element having a relatively short hinge arm and a relatively long hinge arm;
  (b) means for securing said relatively short hinge arm to one of the generally vertical fore and aft frame members bounding the ingress/egress cutout opening in the aircraft fuselage with freedom for rotation about a first generally vertical hinge axis;
  (c) an outwardly opening plug-type aircraft door dimensioned to be received in and to close the ingress/egress cutout opening in the aircraft fuselage, said door being mounted in cantilever fashion on the free extremity of said relatively long hinge arm for rotation about a second generally vertical hinge axis and with freedom for limited up and down vertical movement relative to said hinge element and the ingress/egress cutout opening in the aircraft fuselage;
  (d) means defining a programming mechanism interconnecting said aircraft door, said hinge element and said one of the fore and aft fuselage frame members for controlling the rotational attitude of said aircraft door as the latter is shifted between fully closed and fully opened positions and for maintaining said aircraft door in a plane essentially parallel to the plane conatining the ingress/egress cutout opening at all door positions, said programming mechanism defining means comprising a double 4-bar linkage assembly such that the ingress/egress cutout opening in the aircraft fuselage is essentially devoid of any obstructions when said aircraft door is in the fully open position;
  (e) cooperable latch means mounted on the fore and aft vertical edges of said aircraft door and on the fore and aft generally vertical fuselage frame members bounding the ingress/egress cutout opening for selectively latching said aircraft door in a seated, fully closed and latched condition, said cooperable latch means including an open-ended latch track mounted on each of the fore and aft fuselage frame members bounding the cutout opening and cooperable latch rollers projecting fore and aft from respective ones of the fore and aft edges of said door with freedom for movement outboard along said tracks during door opening movement and inboard along said tracks during door closing movement; and, (f) manually operable actuating means mounted on said aircraft door for lifting said aircraft door within the fuselage ingress/egress cutout opening a distance on the order of approximately two inches from a seated, fully latched and closed position to a raised unlatched and closed position and for lowering said aircraft door within the fuselage ingress/egress cutout opening a distance on the order of approximately two inches from a raised, unlatched and closed position to a seated, fully latched and closed position, said manually operable actuating means including cam track defining means, cam follower means, an inner main operating handle rotatably mounted on said door, a latch torque tube extending transversely across said door and journaled for rotation therein, said latch torque tube projecting beyond the fore and aft vertical edges of said door, fore and aft latch cranks mounted on respective ones of said fore and aft projecting portions of said torque tube, and first control linkage defining means drivingly interconnecting said handle and said torque tube for causing rotation of said torque tube during a portion of rotational movement manually imparted to said handle; and, wherein said latch rollers are mounted on respective ones of said fore and aft latch cranks, said handle is connected to one of said cam track defining means and said cam follower means; said first control linkage defining means is connected to the other of said cam track defining means and said cam follower means; and, said cam track defining means is profiled as a single continuous cam track so as to cause movement of said first control linkage defining means and consequent rotation of said torque tube during a selected portion only of handle rotation with said first control linkage defining means being in a stationary dwell position during all other portions of handle rotation; whereby rotational movement of said handle causes rotation of said torque tube and said latch cranks and, as a result of mutual coaction between said latch rollers and said latch tracks, said door is lifted during a door unlatching operation and lowered during a door latching operation by an amount equal to the effective length of said latch cranks;

whereby said aircraft door may be shifted between a seated, fully latched and closed position and a raised, unlatched and closed position by manual actuation of said actuating means; and, whereby said aircraft door, when in a raised, unlatched and closed position, can be manually shifted out of the ingress/egress cutout opening to a fully open position wherein said door is located outboard of the aircraft fuselage with the door's inner surface and the fuselage outer surface in facing relation with said door being maintained in a plane essentially parallel to the plane containing the ingress/egress cutout opening at all door positions intermediate a fully closed and fully opened position and with the ingress/egress cutout opening being substantially devoid of laterally projecting hinge and/or actuating components when said door is fully opened.

17. An outward opening plug-type aircraft door as set forth in claim 16 further including a pressure lock gate pivotally mounted on said door for permitting (i) interior cabin pressurization and (ii) equalization of interior and exterior cabin pressure when interior cabin pressure is less than ambient pressure; wherein said manually operable actuating means is coupled to said pressure lock gate for (iii) sequentially opening said gate and thereafter unlatching a fully seated latched door and (iv) sequentially latching an unlatched door and thereafter closing said gate; and (v), providing a pressure stop to prevent upward movement of the door during flight; and, wherein said manually operable actuating means include cam track defining means, first and second cam follower means, and second control linkage defining means; said handle is connected to said cam track defining means; said first control linkage defining means is coupled to said first cam follower means; said pressure lock gate is coupled to said second cam follower means by said second control linkage defining means; and, said cam track defining means is profiled so that during a door unlatching operation when said handle is manually rotated in a first direction, said second cam follower means is shifted during the initial portion of handle unlatching rotation so as to shift said second control linkage defining means and open said pressure lock gate while said first cam follower means dwells, and so that said first cam follower means is shifted during a subsequent portion of handle unlatching rotation so as to shift said first control linkage defining means and unlatch said door while said second cam follower means dwells with said pressure lock gate in the open position and so that during a door latching operation when said handle is manually rotated in a direction opposite to said first direction, said first cam follower means is shifted during the initial portion of handle latching rotation so as to shift said first control linkage defining means, and lower, seat, and latch said door while said second cam follower means dwells with said pressure lock gate in the open position and so that said second cam follower means is shifted during a subsequent portion of handle latching rotation so as to shift said second control linkage defining means to close said pressure lock gate while said first cam follower means is in the dwell position.

18. An outward opening plug-type aircraft door as set forth in claim 17 wherein said second control linkage defining means includes a resilient compressible member so as to permit opening of said pressure lock gate when ambient pressure exceeds cabin pressure.

* * * * *